United States Patent [19]
Yano et al.

[11] Patent Number: 5,751,310
[45] Date of Patent: May 12, 1998

[54] INK JET RECORDING APPARATUS CAPABLE OF PREVENTING BLOTTING AT BOUNDARY OF COLORS AND RECORDING METHOD THEREFOR

[75] Inventors: Kentaro Yano; Naoji Otsuka, both of Yokohama; Jiro Moriyama; Nobuyuki Kuwabara, both of Kawasaki; Isao Ebisawa, Yokohama; Atsushi Arai; Hisao Yaegashi, both of Kawasaki; Toshiharu Inui, Yokohama; Kiichiro Takahashi, Kawasaki; Osamu Iwasaki, Tokyo; Daigoro Kanematsu, Yokohama, all of Japan

[73] Assignee: Canon Kabushiki Kaisha, Tokyo, Japan

[21] Appl. No.: 329,414

[22] Filed: Oct. 27, 1994

[30] Foreign Application Priority Data

Oct. 28, 1993 [JP] Japan ............... 5-270582

[51] Int. Cl.⁶ ............... B41J 2/21; B41J 2/205
[52] U.S. Cl. ............... 347/43; 347/15
[58] Field of Search ............... 347/43, 15, 14, 347/100, 40, 37

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,700,399 | 10/1987 | Yoshida ............... 382/17 |
| 4,723,129 | 2/1988 | Endo et al. . |
| 4,740,796 | 4/1988 | Endo et al. . |
| 5,168,552 | 12/1992 | Vaughn et al. ............... 315/109 |
| 5,225,849 | 7/1993 | Suzuki et al. ............... 347/14 |
| 5,241,396 | 8/1993 | Harrington ............... 358/296 |
| 5,428,377 | 6/1995 | Stoffel et al. ............... 347/15 |
| 5,430,469 | 7/1995 | Shioya et al. ............... 347/15 |
| 5,475,800 | 12/1995 | Vaughn et al. ............... 395/109 |
| 5,550,569 | 8/1996 | Wright ............... 347/15 |

FOREIGN PATENT DOCUMENTS

| | | |
|---|---|---|
| 54-56847 | 5/1979 | Japan . |
| 59-123670 | 7/1984 | Japan . |
| 59-138461 | 8/1984 | Japan . |
| 60-71260 | 4/1985 | Japan . |

*Primary Examiner*—Benjamin R. Fuller
*Assistant Examiner*—Thinh Nguyen
*Attorney, Agent, or Firm*—Fitzpatrick, Cella, Harper & Scinto

[57] ABSTRACT

In image recording by discharging plural inks of different characteristics onto a recording medium, recording pixels to be recorded by at least one of the inks of either yellow, magenta or cyan color subjected to pixel expansion are expanded in four direction, then a logic product is calculated between the expanded pixels and the pixels to be recorded with an ink which is black not subjected to pixel expansion, and the recording pixels to be recorded by the ink which is black not subjected to pixel expansion are replaced by the pixels formed by the inks (Y, M, C) subjected to pixel expansion. Thus high-quality image recording is made possible even in case the inks of different properties are brought into mutual contact.

42 Claims, 16 Drawing Sheets

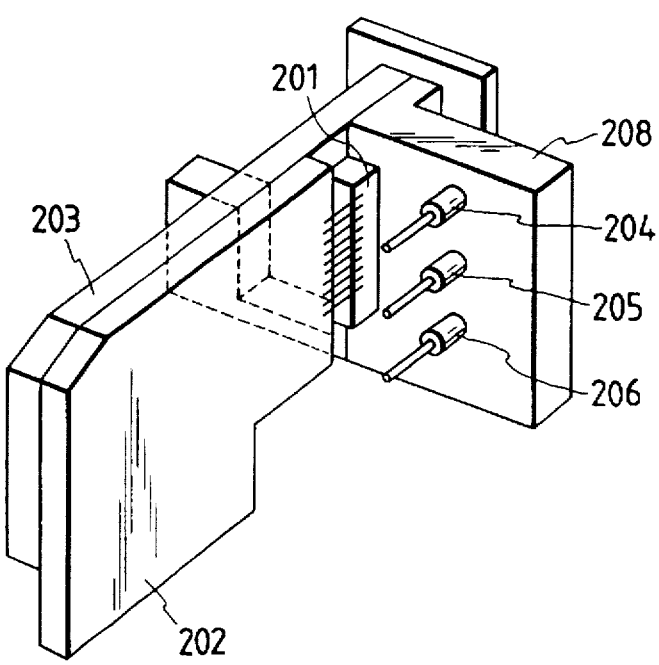
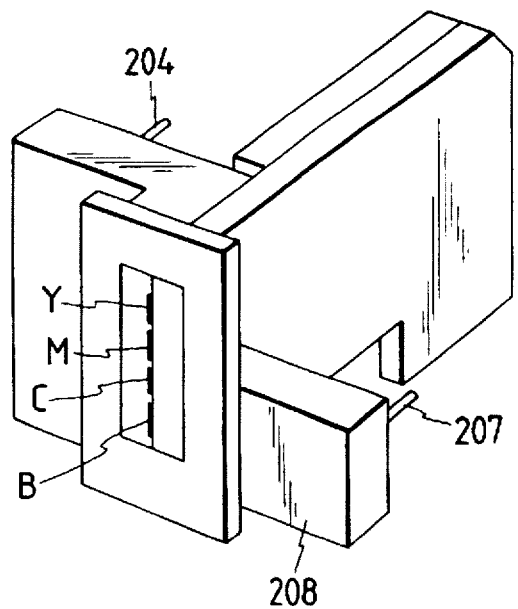
FIG. 2

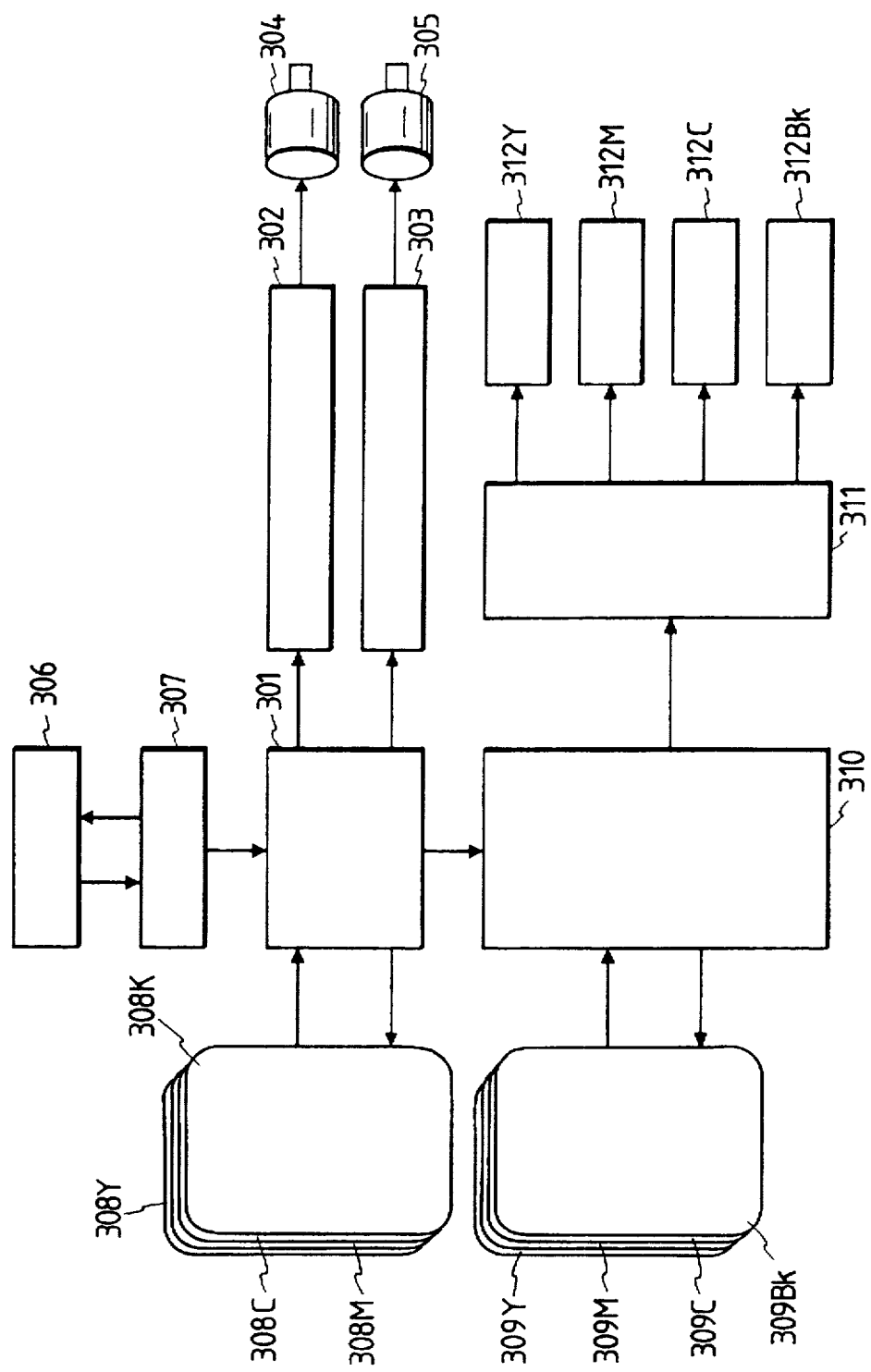

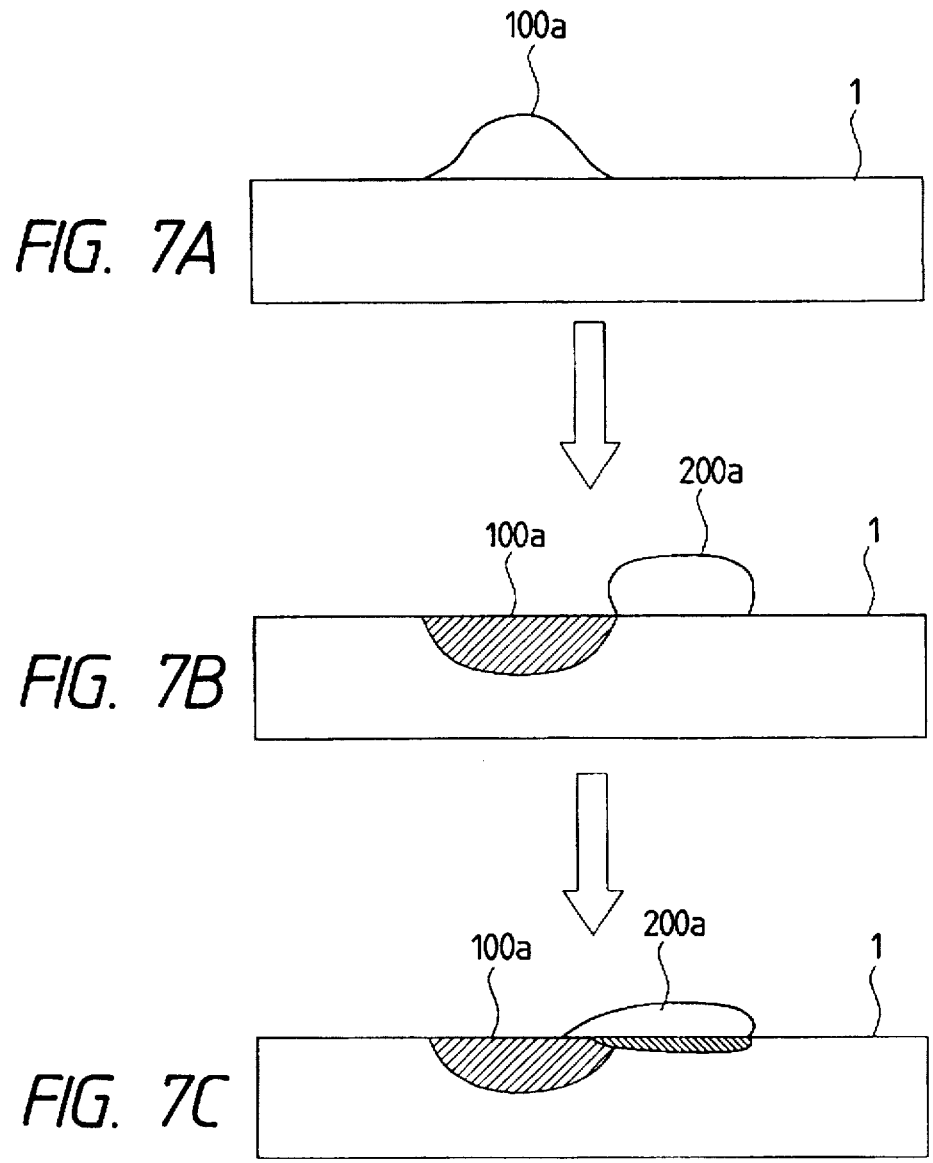

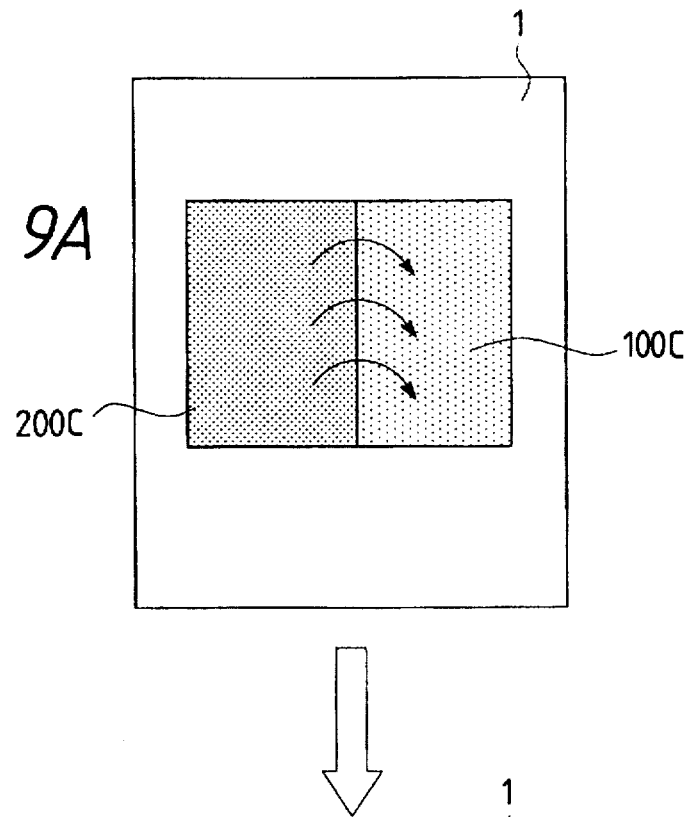
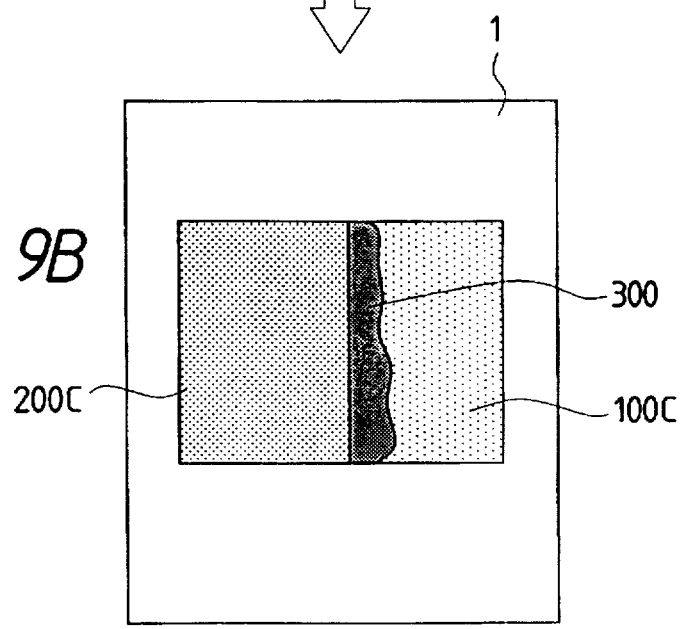

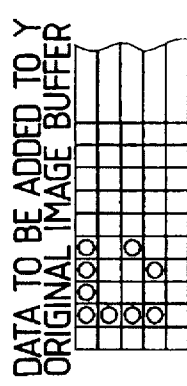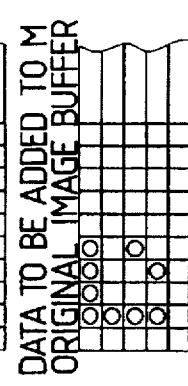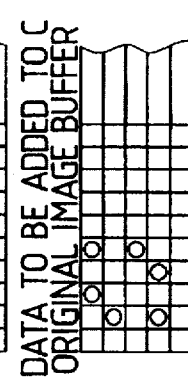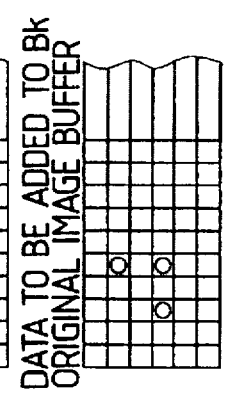
FIG. 12C
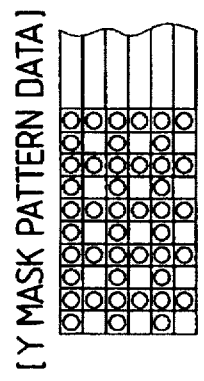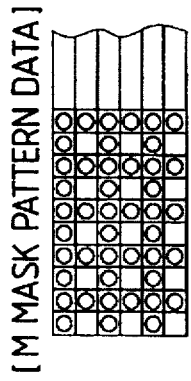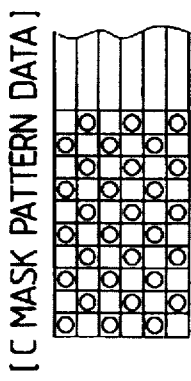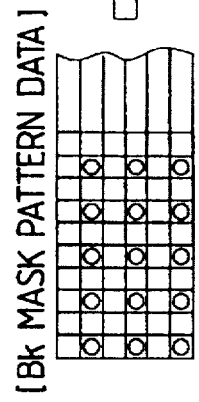
FIG. 12B
&
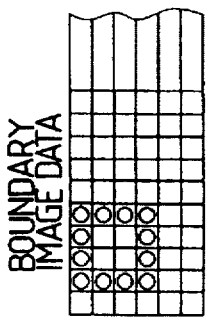
FIG. 12A

INK JET RECORDING APPARATUS CAPABLE OF PREVENTING BLOTTING AT BOUNDARY OF COLORS AND RECORDING METHOD THEREFOR

BACKGROUND OF THE INVENTION

1. Field of the Invention

The present invention relates to a recording apparatus for image recording with color ink such as ink of yellow, magenta and/or cyan and with different ink such as black ink, and more particularly to an ink jet recording apparatus enabling image recording of high image quality even when recording pixels of different inks are positioned close.

The present invention is applicable to any apparatus utilizing various recording media such as paper, cloth, non-woven cloth and OHP sheet Examples of such apparatus include an office equipment such as a printer, a copying machine or a facsimile equipment, and a mass-production apparatus.

2. Related Background Art

Office automation equipments such as personal computers and word processors are recently utilized widely. For printing the information entered by such equipment, there have been developed various recording methods such as wire dot printing, thermal transfer printing and ink jet printing. The recent progress in DTP (desk top publishing) has resulted in a marked increase in the needs for recording apparatus capable of color image information output, and ink jet recording is attracting attention as a method capable of high-quality color image output with a low cost.

One of the representative factors governing the image quality level of such ink jet recording apparatus is the recording ink. In general the recording ink consists of aqueous liquid, and the mechanism of such aqueous recording ink to the recording medium can be roughly classified into penetration type and evaporation type.

In the following there will be given a more detailed explanation, with reference to FIGS. 4A to 4C, on the fixing mechanism of the recording ink of such penetration type and that of evaporation type to the recording medium. In these drawings, there are shown a recording medium 1, ink 100 of penetration type and ink 200 of evaporation type. FIG. 4A shows the state of recording liquid droplet immediately after landing of each recording ink on the recording medium. The ink 100 of penetration type, having large wettability to the recording medium, shows a small contact angle and presents a form spread at the bottom. On the other hand, the ink 200 of evaporation type, having small wettability to the recording medium, shows a large contact angle and presents a form relatively close to a sphere.

After landing, the ink 100 of penetration type promptly starts to penetrate into the recording medium as shown in FIG. 4B, but the ink 200 of evaporation type only slowly penetrates into the recording medium. In the recording medium generally called plain paper, water-repellent material called sizing agent is externally or internally added in the paper making process, and the penetration of aqueous ink with low wettability is presumably hindered by such substance.

FIG. 4C shows the state of both inks, when fixed in the recording medium. As will be apparent from this drawing, the ink of penetration type, because of the large wettability to the recording medium, penetrates even to a deep portion of the recording medium, so that the fixation is completed very rapidly though the color developing ability is inferior. On the other hand, the recording ink of evaporation type, being fixed in the surfacial area of the recording medium, is superior in the color developing ability because of concentration of the dye in the surfacial area, but requires a longer time for fixation. Thus the inks of both types have mutually contradicting features.

In general terms of the time required for fixation, the ink of penetration type is absorbed in the recording medium in about several microseconds to several milliseconds, whereas the ink of evaporation type requires several seconds to several tens of seconds for absorption in the recording medium. The ink of penetration type may be obtained, for example, by adding a surfactant to lower the apparent surface tension of the ink, thereby improving the wettability to the recording medium and enhancing the penetrating phenomenon.

In the foregoing explanation the phenomena are somewhat exaggerated in order to facilitate understanding of the fixing mechanism, but the recording ink of penetration type is not completely free from evaporation, and the ink of evaporation type is also associated with penetrating phenomenon. Also depending upon the composition, there can theoretically be present ink showing an intermediate property between the penetration type and the evaporation type.

However, in the conventional recording methods employing the ink of penetration type and/or the ink of evaporation type, there are encountered defects on the recorded image when inks of different kinds are present in mutual contact.

For this reason, for example in the color ink jet recording apparatus, there has been employed a method of selecting exclusively designed coated paper as the recording medium thereby increasing penetration into the recording medium while achieving high color developing ability by the characteristics of the recording medium, or a method of recording control in which ink of evaporation type is completely fixed before another ink is applied. However, such methods do not necessarily satisfy the requirements of the users because of the limitation on the recording medium or the time required for printing (throughput).

SUMMARY OF THE INVENTION

An object of the present invention is to provide an ink jet recording apparatus and a recording method therefore, capable of resolving the deterioration of the image resulting from close positioning of different inks, thereby enabling image recording of high image quality.

Another object of the present invention is to provide an ink jet recording apparatus and a recording method therefor, enabling image recording of high image quality even in case black ink and color ink are positioned mutually close.

In order to attain the above-mentioned objects, the present invention provides an ink jet recording apparatus for image recording by discharging plural inks of different characteristics onto a recording medium, comprising:

- expansion means for expanding a recording pixel, to be recorded by at least an ink subjected to pixel expansion, in four directions (to the peripheral area);
- logic produce means for calculating a logic produce of the pixel expanded by said expansion means and a recording pixel to be recorded by an ink not subjected to pixel expansion; and
- replacement means for replacing the pixel to be recorded by said ink not subjected to pixel expansion with a pixel to be recorded by said ink subjected to pixel expansion, according to the result of calculation by said logic product means.

According to the present invention, there is also provided an ink jet recording apparatus for image recording by discharging plural inks of different characteristics onto a recording medium, comprising:

boundary detection means for detecting the presence of a pixel to be formed by an ink of said different characteristics within a distance of 1 mm, on said recording medium, around an object pixel; and replacement means for replacing said object pixel with a pixel by said ink of different characteristics, according to the detection of boundary by said boundary detection means.

According to the present invention, there is also provided an ink jet recording apparatus for image recording by discharging a black ink and at least another color ink onto a recording medium, comprising:

black and color memories for two-dimensionally storing the recording data, corresponding to the pixels where black and color inks are respectively to be discharged;

expansion means for two-dimensionally expanding the recording data of said color memory;

logic product means for calculating a logic product, for each pixel, of the recording data, expanded by said expansion means, of said color memory and the recording data of the black memory; and replacement means for replacing the recording data of said black memory with the corresponding recording data of said color memory, according to the result of calculation of said logic product means.

According to the present invention, there is also provided an ink jet recording method for image recording by discharging plural inks of different characteristics onto a recording medium, comprising steps of:

expanding a pixel to be recorded by at least an ink subjected to pixel expansion in four directions (to the peripheral area);

calculating a logic product of the expanded pixel and a recording pixel to be recorded by an ink not subjected to pixel expansion;

replacing the pixel to be recorded by said ink not subjected to pixel expansion with a pixel to be recorded by said ink subjected to pixel expansion, according to the result of calculation of said logic product; and discharging ink corresponding to the replaced pixel onto the recording medium.

According to the present invention, there is also provided an ink jet recording method for image recording by discharging plural inks of different characteristics onto a recording medium, comprising steps of:

detecting the presence of a pixel to be formed by an ink of said different characteristics within a distance of 1 mm on said recording medium around an object pixel;

replacing said object pixel with a pixel to be formed by said ink of different characteristics according to the result of detection in said detecting step; and discharging inks corresponding to the replacement of pixels onto the recording medium.

According to the present invention, there is also provided an ink jet recording method for image recording by discharging a black ink and at least a color ink onto a recording medium, comprising steps of:

two-dimensionally storing recording data, corresponding to the pixels where black ink and color ink are to be respectively discharged, in black and color memories;

two-dimensionally expanding the recording data of said color memory;

calculating a logic product, for each pixel, of the expanded recording data of the color memory and the recording data of the black memory;

replacing the recording data of said black memory with the corresponding recording data of said color memory according to the result of calculation of the logic product; and discharging inks corresponding to the replacement of pixels onto the recording medium.

BRIEF DESCRIPTION OF THE DRAWINGS

FIG. 2 is a perspective view of a recording head of an ink jet recording apparatus in which the present invention is applicable;

FIG. 3 is a block diagram of a control circuit of an ink jet recording apparatus in which the present invention is applicable;

FIGS. 6A to 7C are schematic views showing the defect when an ink of evaporation type and an ink of penetration type are in contact;

FIGS. 9A and 9B are schematic views showing the boundary blotting when inks of penetration type are in contact;

FIGS. 12A to 12C are schematic views showing pixel conversion to PCBk in an embodiment 2;

DESCRIPTION OF THE PREFERRED EMBODIMENTS

In the conventional recording methods, employing the ink of penetration type and/or the ink of evaporation type, a defect has always been generated whenever different inks are brought into mutual contact as in the color recording. Such defect will be explained in more detail in the following, with reference to the attached drawings.

Figure 5A:
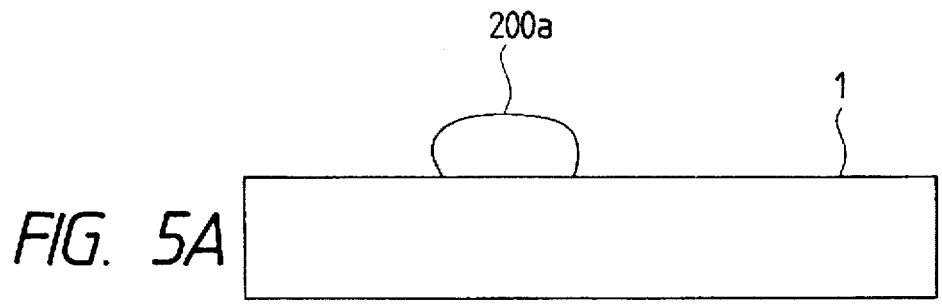
FIGS. 5A to 5C are schematic views showing the defect when inks of evaporation type are in contact.
Figure 5B:
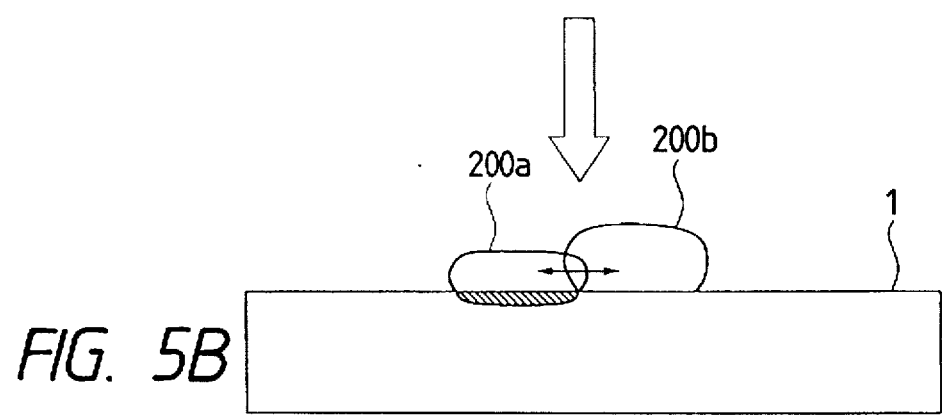
Figure 5C:
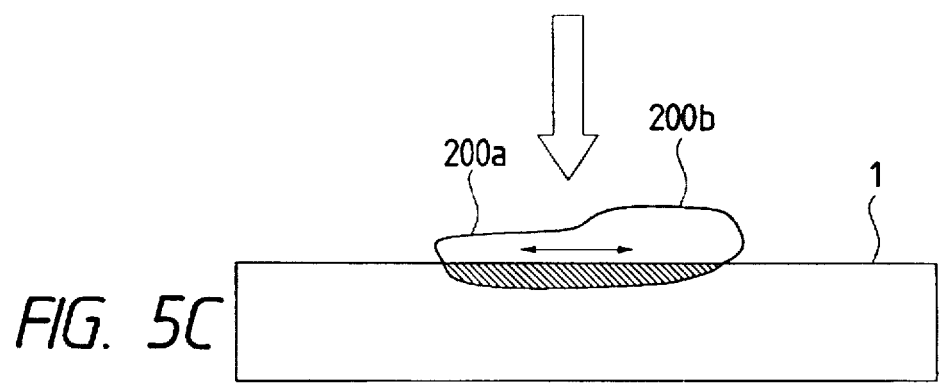

FIGS. 5A to 5C illustrate the defect generated when inks of evaporation type for example of different colors are in mutual contact, wherein shown are a recording medium 1, an ink 200a of evaporation type, and an ink 200b of evaporation type of another color.

At first the ink 200a lands on the recording medium as shown in FIG. 5A. Then, with a certain delay in time, the ink 200b lands on the recording medium, in the vicinity of the ink 200a, as shown in FIG. 5B. In this state, as the ink 200a is not yet fixed completely, it is mixed with the ink 200b, on the surface of the recording medium, in the vicinity of the boundary of inks, thereby causing color mixing and thus deteriorating the recorded image, as shown in FIG. 5C.

Figure 6A:
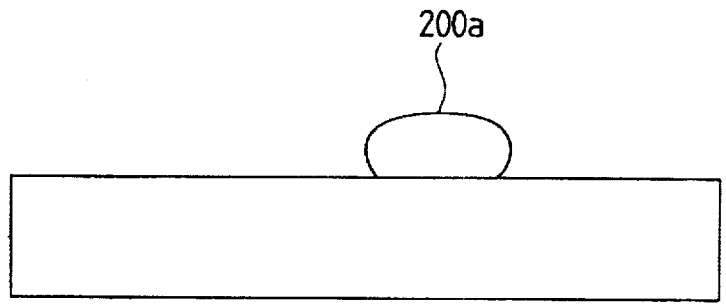
Figure 6B:
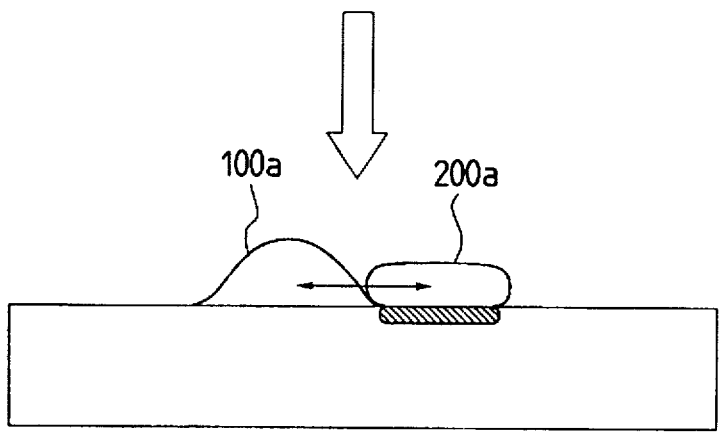
Figure 6C:
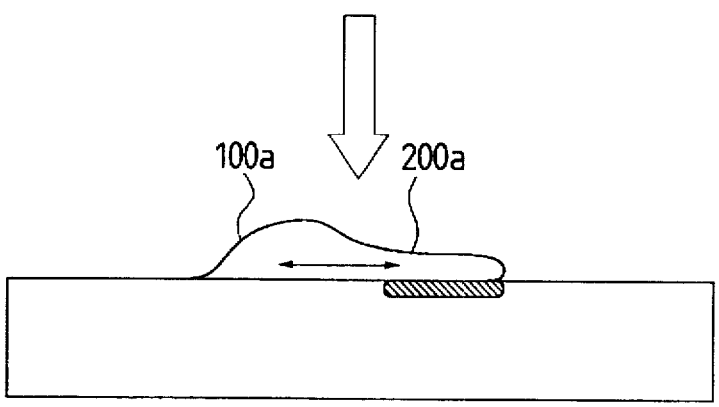

FIGS. 6A to 6C illustrate a case in which an ink 200a of evaporation type at first lands on the recording medium 1 and then an ink 100a of penetration type lands in the vicinity. As the ink of evaporation type is not yet fixed at the landing of the ink of penetration type, there is generated deterioration of the image by color mixing as in the case where the inks of evaporation type are brought into contact.

In contrast to the foregoing, FIGS. 7A to 7C illustrate a case in which an ink 100a of penetration type lands at first and then an ink 200a of evaporation type lands in the vicinity. The inks are not mixed on the surface of the recording medium if the ink of evaporation type lands after the first landing ink of penetration type has penetrated into the recording medium. However the surface of the recording medium, after the landing of the ink of penetration type has been changed to an extremely wettable state, so that the ink 200a of evaporation type flows to the side of the ink 100a of penetration type on the surface of the recording medium, thereby irregularly distorting the boundary of the image to be formed by the ink 200a and thus deteriorating the image quality.

Figure 8A:
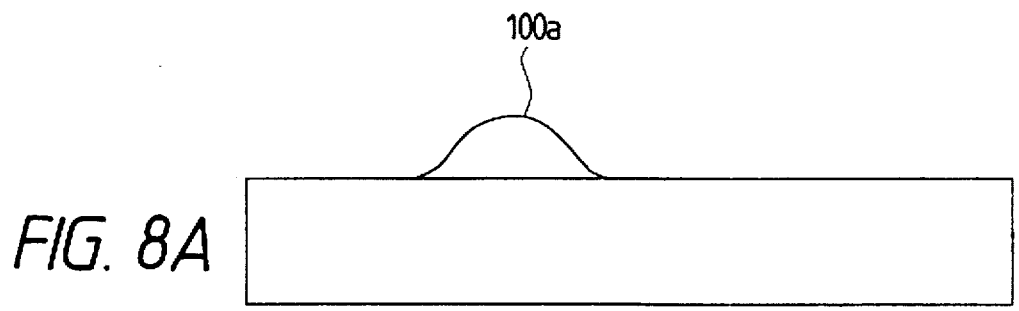
FIGS. 8A to 8C are schematic views showing the defect when inks of penetration type are in contact.
Figure 8B:
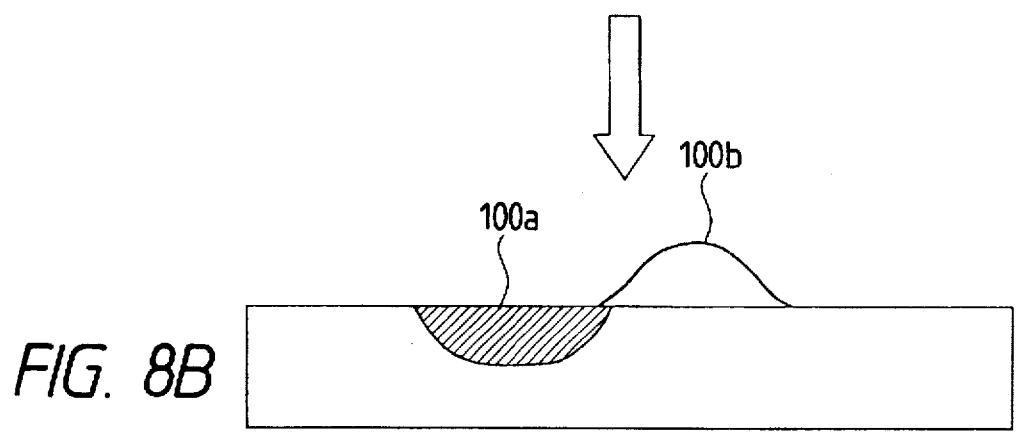
Figure 8C:
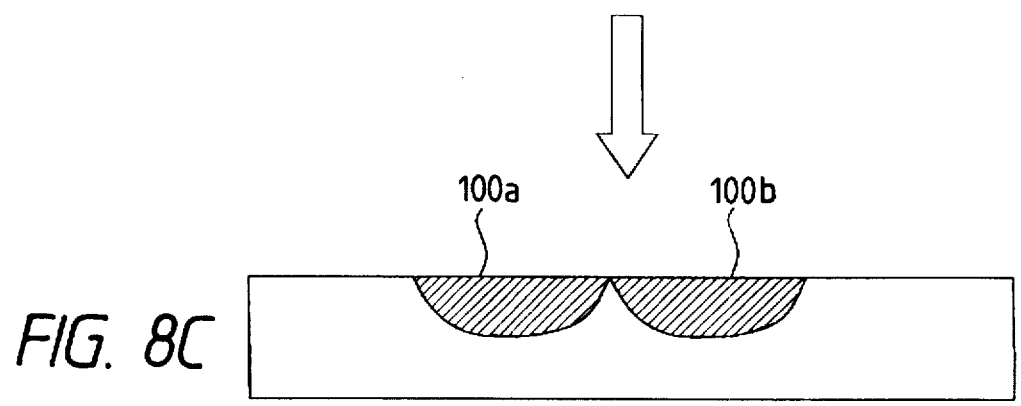

Also FIGS. 8A to 8C illustrate a case in which inks 100a, 100b of penetration type are brought into contact. In this case there can be prevented mixing or flow of the inks on the surface of the recording medium, but the color developing ability is inferior because the ink of penetration type sinks deep in the recording medium as explained before.

For this reason it is difficult to obtain a high contrast to the recording medium, and, even if the inks of yellow, cyan and magenta colors are usable, the deterioration of image quality becomes conspicuous in the black (Bk) ink which is used for contour enhancement or in characters and for which strong edge sharpness is required. For this reason, for the black color, there is strongly desired the ink of evaporation type which causes trapping of the dye in the surfacial layer.

The present invention, which has been attained in consideration of the drawbacks mentioned above, will be explained in the following by embodiments thereof.

At first there will be explained the configuration employed in these embodiments.

Figure 1:
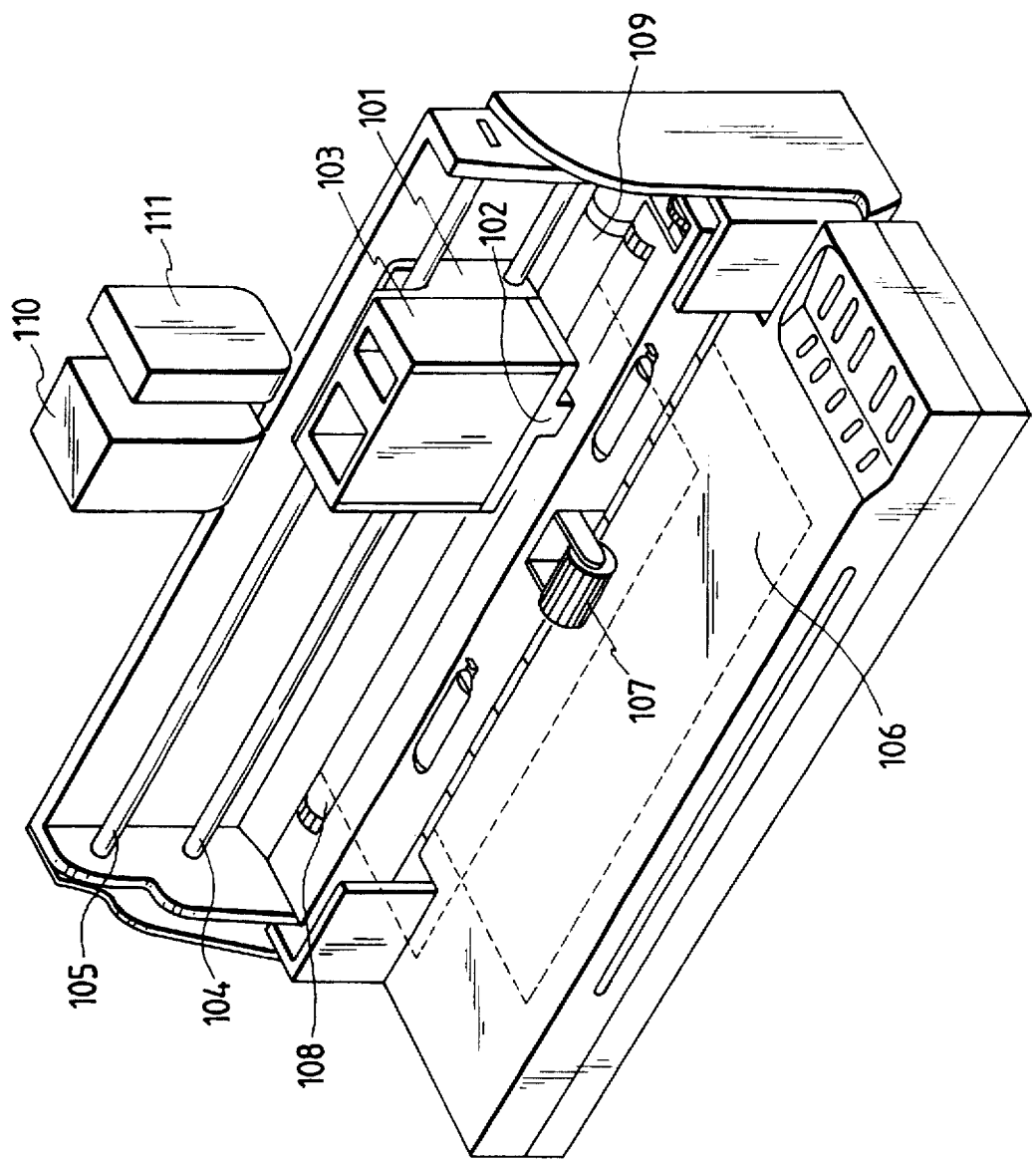
FIG. 1 is a perspective view of an ink jet recording apparatus in which the present invention is applicable.
Figure 4A:
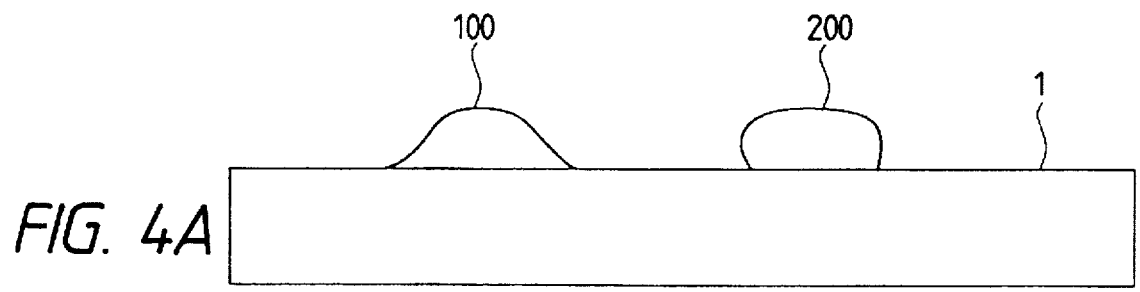
FIGS. 4A to 4C are schematic views showing the fixing mechanism of the ink of penetration type and that of evaporation type.
Figure 4B:
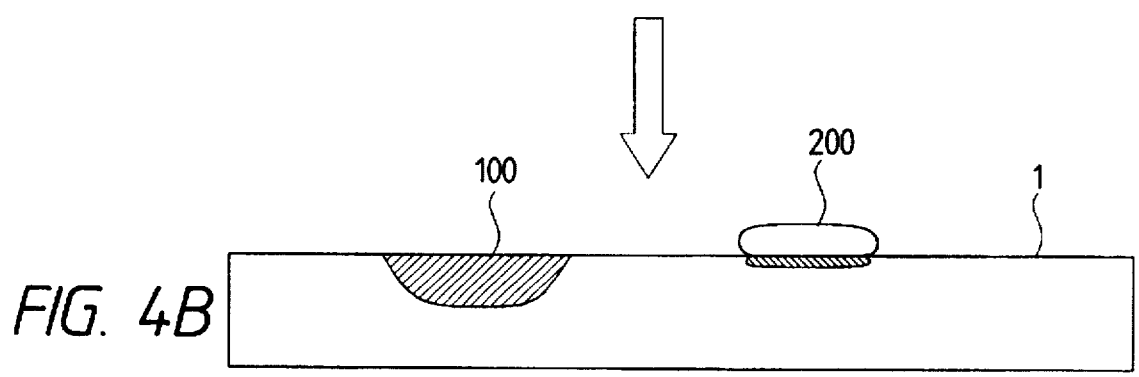
Figure 4C:
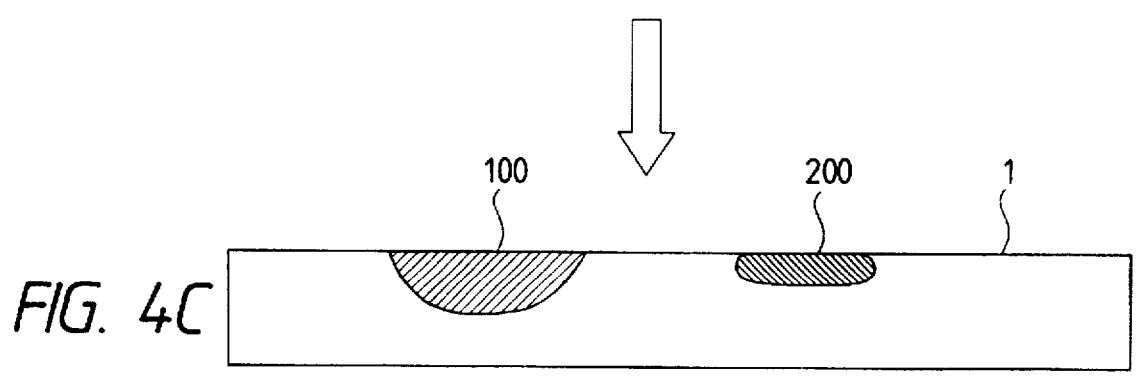

FIG. 1 is a perspective view of a recording apparatus in which the ink jet recording method of the present invention is applied.

A carriage 101 supports a recording head 102 and a cartridge guide 103, and is rendered capable of scanning motion along guide shafts 104, 105.

A recording sheet 106 is supplied by a feed roller 107 into the apparatus, and pinched by an advancing roller 108, a pinch roller (not shown) and a pressure plate 109, thereby being advanced on said advancing roller 108 for image printing. In the ink cartridge 103, a color ink cartridge 110 containing inks of yellow, magenta and cyan colors and a black ink cartridge 111 are separately inserted and communicate with the recording head 102.

The inks of yellow, magenta and cyan colors, contained in the color ink cartridge 110, are those of high penetration speeds into the recording sheet, in order to prevent ink blotting at the boundary of colors in the color image formation. On the other hand, the black ink contained in the black ink cartridge 111 is of a relatively low penetration speed into the recording sheet, in comparison with the above-mentioned three color inks, in order to obtain black image of a high density and high quality with reduced ink blotting.

FIG. 2 illustrate the recording head 102.

In the drawing, the upper half shows the recording head rear-side ways and the lower half shows it front-side ways. On a front face of said recording head 102, groups of discharge openings for the yellow, magenta, cyan and black inks are linearly aligned. Each group for yellow, magenta or cyan color contains 24 discharge openings, while the group for black color contains 64 discharge openings, and these groups are separated by a distance larger than the pitch of said discharge openings. Said pitch of the discharge openings is 70.5 μm, corresponding to a resolving power of 360 dpi (dots per inch).

These discharge openings are provided respectively with ink paths communicating there with, and, behind such ink paths there is provided a common liquid chamber for ink supply to said ink paths. These ink paths, respectively corresponding to the discharge openings, are provided with electrothermal converters for generating thermal energy to be utilized for ink droplet discharge from said discharge openings, and with electrodes for electric power supply to said electrothermal converters. These electrothermal converters (discharge heaters) and the electrode wirings are formed by a film forming technology on a substrate 201 such as of silicon. The above-mentioned discharge openings, ink paths and common liquid chamber are formed by laminating, on said substrate, a partition, a cover plate etc. composed for example of glass and resin. Further in the back a driving circuit for driving said electro-thermal converters with recording signals is provided as a printed circuit board.

Instead of said glass member, an orifice plate, bearing partitions for separating plural ink paths and a common liquid chamber, may be adhered to said substrate. Such orifice plate is integrally molded and is preferably composed of polysulfon resin, but there may also be employed other molding resins.

The silicon substrate 201 and the printed circuit board 202 are positioned parallel to a common aluminum plate 203. Pipes 204–207 protrude from a plastic member 208 called distributor and extending perpendicularly to the silicon substrate, and communicate with flow paths which are provided in said distributor and communicate with the common liquid chambers.

In said distributor, there are provided four flow paths, respectively for yellow, magenta, cyan and black inks, connecting said pipes respectively with the common liquid chambers.

In the present embodiment, the ink tanks respectively for the color inks and the black ink are rendered independently replaceable, but there may also be employed a disposable recording head which integrally includes ink tanks and recording heads.

Each of the discharge openings for yellow, magenta and cyan colors provided on the recording head 102 emits ink of about 40 ng, while each of the discharge openings for black color emits ink of about 80 ng.

FIG. 3 is a block diagram of the electric control system of the color ink jet recording apparatus explained above.

A system controller 301 for controlling the entire apparatus includes therein a microprocessor, a ROM storing the control programs, a RAM to be utilized in the process execution by the microprocessor. There are also provided a driver 302 for driving the recording head in the main scanning direction, a driver 303 for drive in the sub scanning direction, and motors 304, 305 respectively corresponding to said drivers and activated by signals indicating the speed, moving distance etc. from said drivers.

There are further shown a host computer 306 for transferring information to be printed to the recording apparatus of the present invention; a reception buffer 307 for temporarily storing the data from the host computer 306; until data are fetched from the system controller 301; and a frame memory 308 for developing the printing data into image data, having a memory size required for recording. In the present embodiment, the frame memory is assumed to have a size capable of storing data corresponding to a printing sheet, but the present invention is not limited by the size of the frame memory.

There are further provided a memory 309 for temporarily storing the print data, having a memory capacity determined by the number of discharge openings of the recording head; a print control unit 310 for suitably controlling the ink discharge speed, print data number etc. of the recording head according to instructions from the system controller; and a driver 311 for driving the discharge openings 312Y for yellow ink discharge, those 312M for magenta ink discharge, those 312 for cyan ink discharge and those 312Bk for black ink discharge, according to signals from said print control unit 310.

[Embodiment 1]

In the color image recording with the above-explained recording apparatus, there may be encountered a boundary blotting phenomenon caused by mixing of the inks of different colors at the boundary of different color areas. In the present embodiment, however, such blotting phenomenon is prevented by detecting such boundary and effecting a dot replacement process in order to suppress such blotting at said boundary, as will be explained detailedly in the following.

At first there will be explained the recording inks employed in the present embodiment. As explained before, the present embodiment employs four recording inks of Y, M, C and Bk colors. The black (Bk) ink is composed of a dye and a solvent principally composed of water but containing a non-volatile component, and has a surface tension of about 50 dyne/cm.

On the other hand, the yellow, magenta or cyan ink is composed of a dye, a solvent principally composed of water but containing a non-volatile component, and acetylenol for increasing the wettability, and has a surface tension of about 27 dyne/cm. The critical surface tension of an ordinary recording sheet is about 35 dyne/cm. Thus the black ink has a relatively low wettability to the recording sheet, so that dye penetrates only about 20 μm from the surface of the recording sheet. Such black ink, though requiring a relatively long time for fixation, shows a relatively high density and a high contrast to the recording sheet, thus exhibiting high image quality.

On the other hand, the yellow, magenta and cyan inks show very high wettability to the recording sheet, because of the low surface tension mentioned above. They are therefore very rapidly fixed to the recording sheet, but are somewhat inferior in the color developing ability, as they penetrate deep into the recording sheet. However these color inks are so formulated as to suppress the boundary blotting, as the contrast of these color inks to the recording sheet need not, in practice, be so high as in the case of black ink.

The boundary blotting phenomenon does not occur among the Y, M and C inks of penetration type as explained before, but such phenomenon occcurs between any of these Y, M and C inks and the black ink which is formulated as the evaporation type for improving the image quality.

This boundary blotting phenomenon will be explained with reference to FIGS. 9A and 9B, in which shown are a recording medium 1 composed of ordinary recording sheet; an image area 200c recorded with the black ink of evaporation type; and an image area 100c recorded with a color ink of penetration type. When the above-mentioned image areas are positioned mutually close, there will result the ink blotting regardless which ink is deposited first, as already explained with reference to FIGS. 6A to 7C. Thus, even if the image areas are initially recorded as shown in FIG. 9A, the ink 200c of the evaporation type flows out to the image area 100c recorded with the ink of penetration type, with the lapse of time, as shown in FIG. 9B, thereby generating a blotting area 300 and deteriorating the recorded image.

In the following there will be given a detailed explanation of the detection means for the boundary between the black and color inks, constituting first means for preventing such phenomenon.

[Boundary detection]

The boundary is defined, in this embodiment, as a proximity area where the black ink and the color ink are identified to be positioned mutually close. Said boundary area is variable by various factors, such as the landing accuracy of each dot, diameter of each ink droplet, ease of blotting of the ink in the recording medium etc., but, in the present embodiment, the boundary is identified present if a pixel of black ink is present within four pixels around a pixel of the color ink.

In the recording apparatus, the recording data of each color are developed, prior to the actual recording operation, into bit map data of "1" and "0", representing whether the recording is executed or not, in a memory which is hereinafter called the print buffer.

For detecting whether the pixel of black color is present within four pixels around the color pixel, a logic sum of the print buffers for Y, M and C recording is developed in a work buffer 1, thereby preparing a color pixel buffer for color image recording. Then, in a work buffer 2, there are developed data of 4-bit logic sum, in the lateral (X) direction, of the data of the buffer 1, thereby obtaining a pixel buffer consisting of 4-pixel bold of the color pixel data in the X-direction. Then in a work buffer 3, there are developed data of 4-bit logic sum in the vertical (Y) direction, of the data of the buffer 2, thereby obtaining a pixel buffer consisting of 4-pixel bold of the color pixel in the Y-direction. In this manner there are obtained, in the work buffer 3, color pixel data expanded by 4 pixels in the four directions.

Then, in a work buffer 4, there are developed data of logic product of the color bold data of the buffer 3 and the black pixel data of the black print buffer.

In this state, the pixel data remaining in said work buffer 4 are the boundary pixels, where the black pixel is present within four pixels of the color pixel.

In the foregoing explanation there are utilized four work buffers in order to facilitate understanding, but all the processes may be executed on a single buffer.

The vertical or horizontal dot size (bit map size) to be processed on such buffer is not particularly limited as long as it is at least equal to the number of dots used for boundary detection (9×9 pixels in the present embodiment as peripheral four pixels around the object pixel are processed), but it is often convenient to process, in the horizontal direction, a number of pixels corresponding to a line to be recorded, and, in the vertical direction, a number of pixels corresponding to the discharge openings of the recording head.

Also the logic sum or the logic product may be determined by the function of the CPU or by a logic hardware. Such hardware processing may achieve a high-speed process as the expansion can be simultaneously achieved in the vertical and horizontal direction. Also the process can be executed in the unit of a bit, a byte or a word, but a high-speed processing can be naturally achieved by the processing with a larger unit.

In the dot expansion explained in the foregoing, there is calculated the logic sum of the four pixels at the right and at the left for achieving expansion of four dots at the right and at the left, but it is also possible to expand the dot by eight pixels for example to the right (by calculating a logic sum of eight pixels to the right from the object pixel). In such case, if the buffer before development has a data area of n pixels in the X-direction, the work buffer for development will require a data area of (n+8) pixels extended by 8 pixels to the right, but there can be obtained similar data to the case of calculation of the logic sum of four pixels at the right and at the left, by discarding four pixels at each end, in the X-direction, of said data area and extracting the data from the 5th pixel to the (n+4)-th pixel in the X-direction.

Depending on the structure of the algorithm of the software or of the logic hardware, it is often easier to refer only to preceding addresses or succeeding addresses rather than to refer to both preceding and succeeding addresses, and the above-explained method is effective in such case.

(Replacement or substitution of pixels at the boundary)

When there is detected, in the above-explained manner, the boundary area where blotting may occur between the black pixel and the color pixel, there is effected control so as to avoid defect in the visual sense even if the blotting occurs, as will be explained in detail in the following.

Theoretically, the black pixel can be produced by superposing the inks of Y, M and C colors. Such black pixel, produced by the mixing of the Y, M and C inks, will be hereinafter called PCBk. Since the Y, M and C inks are of penetration type as explained before, the PCBk does not cause color mixing with the pixels of Y, M and C colors. Consequently, the blotting drawback between different inks at the boundary can be resolved by producing all the colors, including the black color, with the Y, M and C inks, but, in practice, it is difficult to obtain the real black color desired by the user in C black image of PCBk produced by the Y, M and C colors. It will be understood that such situation is not limited to the inks employed in the ink jet recording apparatus, but is true for printing field such as gravure printing, as the black color is produced by an exclusive black ink in most cases.

Also, since there is desired read black color of a high contrast, there is not employed the ink of penetration type causing deep sinking of the dye into the recording medium as explained before. The blotting defect at the boundary is induced by the use of the ink of evaporation type.

It is already explained that the PCBk pixel cannot provide the color desired by the user, but it cannot be distinguished by the human eyes if the PCBk area is extremely small. Consequently it is possible, instead of printing all the black image with the PCBk, to convert the recording with the black ink to the PCBk recording in a minimum necessary area only, and the aforementioned blotting defect can thus be suppressed.

In the present embodiment, only the black pixels that are positioned close to the color pixels and tend to cause blotting are replaced (or substituted) by the PCBk. Thus, in the entire image, the read black image of a high contrast is obtained with the black ink, and only the black pixels positioned within a distance of four pixels to the color pixels are formed with the PCBk pixels. The recording apparatus of the present embodiment has a resolving power of 360 dpi, so that four pixels correspond to 0.28 mm. An area of 0.28 mm, even if somewhat different in black color, is not at all distinguishable by the human eyes.

The present inventors have conducted an experiment of forming a frame of PCBk around a black image area of 10×10 mm with the black ink and identifying the width of the frame when the observers can feel the difference, and most observers noticed the difference when the width of the PCBk exceeded about 1 mm. This result indicates that the PCBk black area, if very small, can be tolerated in practice in the black area formed with the black ink.

Therefore, it is possible to improve the quality of the black image in general and to resolve the image deterioration at the boundary of different inks, by detecting the boundary between the color pixels and the black pixels by the aforementioned detecting means and then replacing only the black data at said boundary with the PCBk data.

Since the pixels subjected to said replacement are all black pixels, said pixel replacement can be realized by deleting the black pixels, to be subjected to said replacement, from the original black pixels and adding Y, M and C pixels corresponding to thus deleted black pixels, namely by calculating the logic sum of the original print buffers, representing the original images of the Y, M and C colors, and the additional pixels mentioned above.

As explained in the foregoing, the blotting defect at the boundary can be resolved by effecting deletion and addition of pixels to the print buffer data, representing the original image for each of Y, M, C and Bk colors.

Figure 10A:
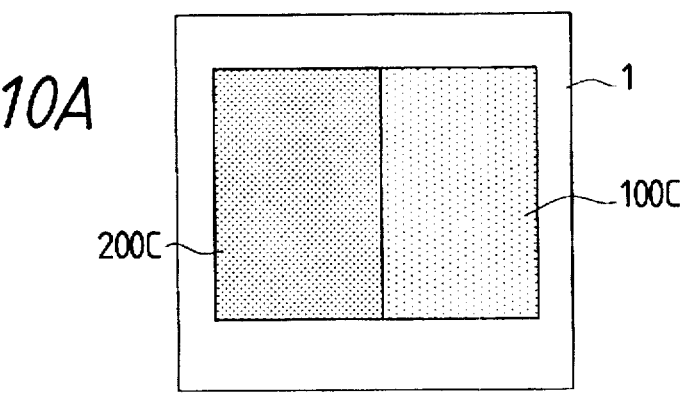
FIGS. 10A to 10C are schematic views showing the boundary blotting when inks of penetration type in an embodiment 1 are in contact.
Figure 10B:
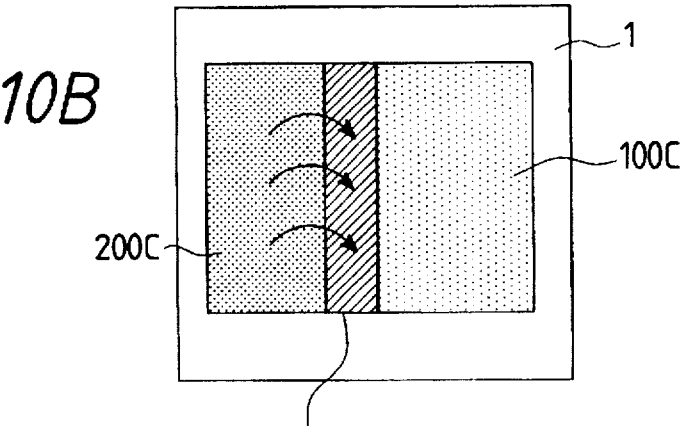
Figure 10C:
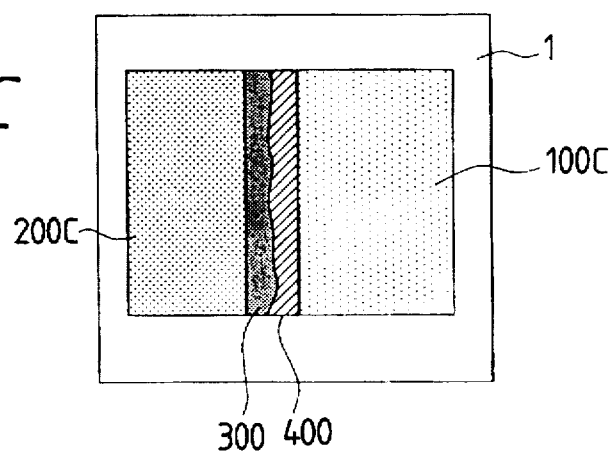

The above-explained control is schematically illustrated in FIGS. 10A to 10C, wherein shown are a recording medium 1, an image area 200c recorded with the black ink of evaporation type, an image area 100c recorded with a color ink of penetration type, and an area 300 where the ink 200c blots toward the area 100c. In a boundary area 400 within the image area 200c, the pixels are converted to the PCBk which are recorded with the inks of penetration type but have a color close to that of the black ink 200c.

If the black ink 200c and the color ink 100c are positioned in mutual contact as shown in FIG. 10A, there will result image deterioration by the blotting phenomenon, as already explained in FIGS. 9A and 9B. Consequently the boundary area is converted to the PCBk as shown in FIG. 10B. Even with such PCBk conversion of the boundary area, the ink of the area 200c flows into PCBk area 400, so that color mixing occurs in the area 300 shown in FIG. 10C.

In such color mixing area, though the mixing occurs between the ink of evaporation type and that of penetration type, the mixing phenomenon is visually not distinguishable because both inks are black. It is therefore possible to prevent the image deterioration, though the blotting and color mixing are in fact present at the boundary.

The wider the PCBk area is, the better it is for suppressing the color mixing defect. But, the narrower it is, the less the difference in color between the black area by the black ink and that by the PCBk appears. In consideration of the result of the aforementioned experiment, the present inventors recommend a width, for said conversion area, at least equal to a dot (70.5 μm in the present embodiment) but not exceeding 1 mm.

Figure 11:
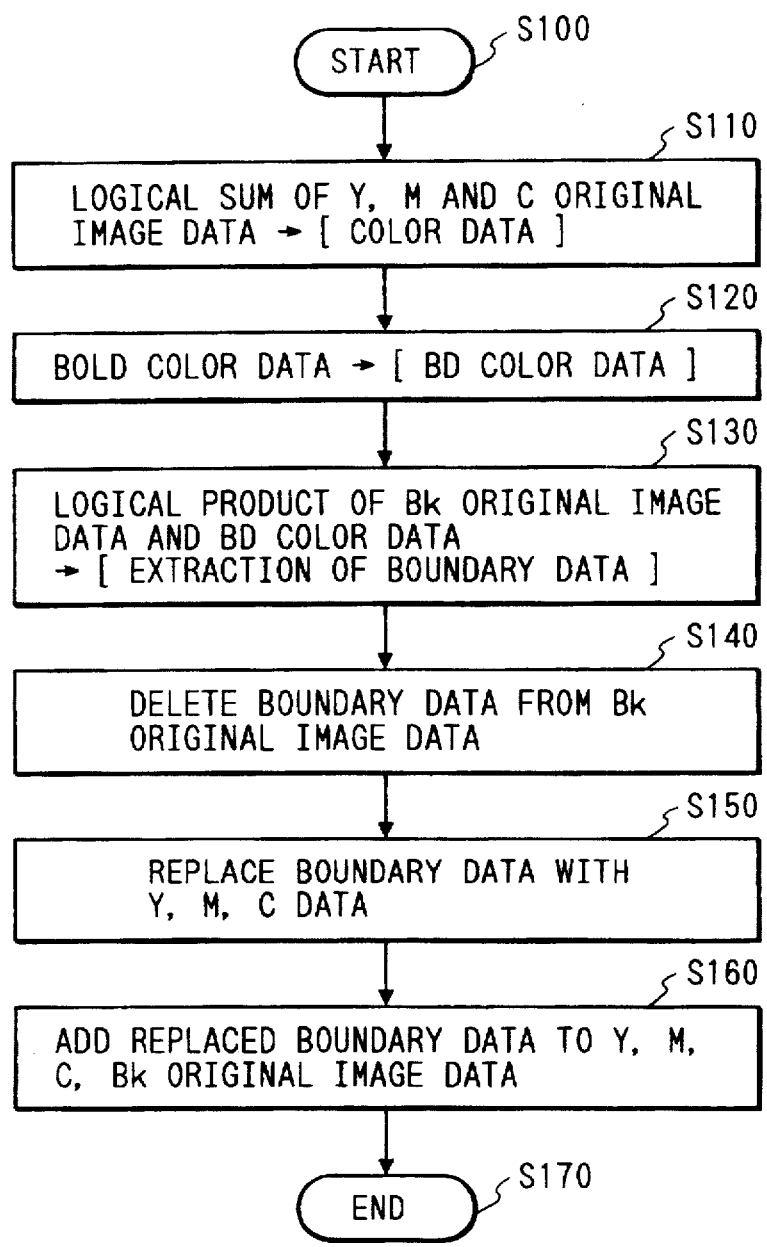
FIG. 11 is a flow chart showing the function of boundary detection and pixel replacement.

In the following there will be explained, with reference to a flow chart shown in FIG. 11, the function of the boundary detecting means and the boundary pixel replacing means.

After a step 100 develops the recording pixels in the print buffers in response to a print command, a color data pixel buffer is prepared by calculating the logic sum (OR) of the Y, M and C pixels, formed by the inks of penetration type in the present embodiment (step S110). Then bold data (BD color data) are prepared by expanding the above-mentioned color data by a predetermined size in vertical and horizontal direction (S120), and the boundary areas where the pixel replacement is required are extracted by calculating the logic product of said BD color data and the black data (S130).

After said extraction of the boundary areas, steps S140 and S150 effect deletion of the data of said boundary areas from the black data and addition of Y, M and C pixels corresponding to the positions of thus deleted black pixels. Subsequently the data of additional pixels of different colors are respectively added (logic sum) to the original Y, M and C data (S160). In this manner there are realized the boundary detecting means and the pixel replacing means at the boundary.

As explained in the foregoing, by means of the boundary detecting means for detecting the area where different inks are positioned in proximity and the boundary pixel replacing means for replacing the recording pixels, in the vicinity of a different ink, with pixels to be formed with at least another ink, there can be provided an ink jet recording method and an ink jet recording apparatus, capable of reducing the visually perceivable level of blotting phenomenon between the different inks in mutual contact and achieving a high color density level, thereby attaining high-quality image recording.

[Embodiment 2]

In the following there will be explained another embodiment of the pixel replacement means, capable improving block tonality by the PCBk and reducing the ratio of pixels per unit area.

In the foregoing embodiment, the pixel replacement is conducted by superposing the Y, M and C colors for all the black pixels subjected to deletion. The Y, M and C pixels are superposed in all the positions of the deleted black pixels, because the black pixel can be theoretically reproduced by the superposition of the Y, M and C pixels, but the printing of three pixels at a pixel position is not necessarily desirable, depending on the ink absorbing ability of the recording medium.

Also the absorption spectra of the Y, M and C inks are often not ideal. For example the yellow ink may have the absorption also in the magenta region. Therefore, in case of producing black color with the Y, M and C inks, more natural black can be obtained by correcting the ratio of deposition of the inks, depending on the absorbances of these inks in other spectral regions, instead of simple 1:1:1 deposition.

With the inks employed in the present embodiment, natural black color can be obtained with a deposition ratio of Y:M:C=3:3:2. Also for attaining the object of the present invention, it is not necessary to strictly forbid the presence of black ink pixels in the boundary area, and the difference between the black image area formed with the black ink and that formed with the PCBk can be made less conspicuous if the black ink is also included, with a low ratio, in the PCBk area. Consequently the ink deposition ratio in the PCBk area is selected as Y:M:C:Bk=3:3:2:1. More specifically, in replacing for example four black pixels with PCBk, the Y and M inks are deposited in three pixels, while the C ink is deposited in two pixels and the black ink is deposited in one pixel, thereby realizing more natural black color and avoiding deposition of unnecessarily many dots per unit area.

Such pixel conversion means will be explained in more detail in the following, with reference to the attached drawings.

FIGS. 12A to 12C are schematic views showing the pixel conversion to the PCBk. FIG. 12A shows the boundary image data to be subjected to the pixel conversion, extracted by the boundary detecting means. The marked pixels are to be originally recorded with the black ink, but are already deleted from the black pixels and are to be replaced by the PCBk pixels.

Such image at the boundary area is converted into Y pixels at a rate of three pixels per every four pixels, also into M pixels at a rate of three pixels per every four pixels, into C pixels at a rate of two pixels per every four pixels, and into Bk pixels at a rate of a pixel per every four pixels. In the present embodiment, for such conversion there is employed a method of determining the pixels to be added, by those remaining in the logic product with a mask pattern shown in FIG. 12B. More specifically;

the additional pixel pattern to the original Y print buffer is defined by {boundary image data in FIG. 12A} & {Y mask pattern in FIG. 12B};

the additional pixel pattern to the original M print buffer is defined by {boundary image data in FIG. 12A} & {M mask pattern in FIG. 12B};

the additional pixel pattern to the original C print buffer is defined by {boundary image data in FIG. 12A} & {C mask pattern in FIG. 12B}; and the additional pixel pattern to the original Bk print buffer is defined by {boundary image data in FIG. 12A} & {Bk mask pattern in FIG. 12B}.

As explained in the foregoing, by means of a PCBk means for extracting the additional pixels, there can be provided an ink jet recording method and an ink jet recording apparatus, capable of realizing more natural black color and avoiding deposition of unnecessarily many dots per unit area, thereby suppressing the boundary blotting defect arising out of the different inks in mutual contact and thus attaining high-quality image recording.

The configuration and functions of the present embodiment, other than the pixel replacement means, will not be explained as they are essentially same as those in the foregoing embodiment.

[Embodiment 3]

In the following there will be explained another embodiment capable of achieving high-speed process in the boundary detection means and the pixel replacement means explained above.

The above-explained boundary detection and pixel replacement may naturally be processed by a software according to the algorithm explained in the foregoing, but such software processing requires an extremely large burden. In the following there will be approximately considered the magnitude of such burden, for example in case of processing data of a line.

In the present embodiment it is assumed that the recording head consists of four heads of Y, M, C and Bk colors, with 64 discharge nozzles for each color, and that the image is recorded with a solving power of 360 dpi on an A4-sized recording sheet. For such case, the print buffer for a line requires a size of 64 dots (8 bytes) for the vertical direction and 2880 dots for the horizontal direction. In case of effecting all the processes by accesses to said buffer in the unit of a byte, the process of calculating the logic sum of the Y, M and C pixels alone requires at least 69,120 (=8×2880 ×3) RAM readings and 23,040 RAM writings. Also after the obtention of the boundary data, there are required, for calculating the logic product with the mask pattern for respective colors and the logic sums of the logic products of respectively colors with the original images, at least 200,000 RAM readings and 90,000 RAM writings. However, the executed processes are not varied by the feedback of the result of the preceding processes but consist of simple loops, so that a hardware for this purpose can be very easily realized.

Figure 13:
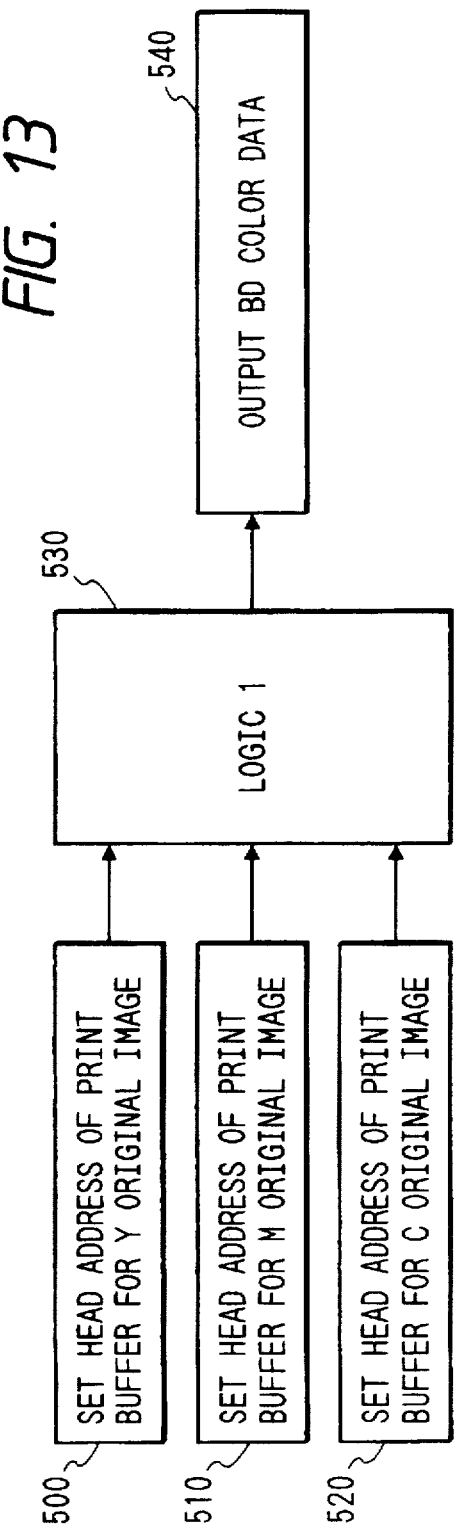
FIGS. 13 to 15 are block diagrams of an embodiment 3 in which boundary detection and pixel replacement are conducted by a hardware.
Figure 14:
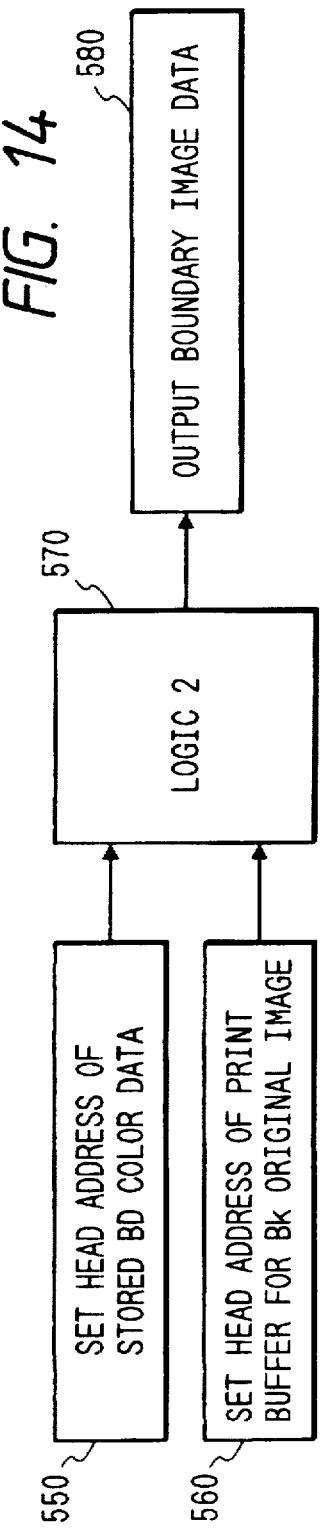
Figure 15:
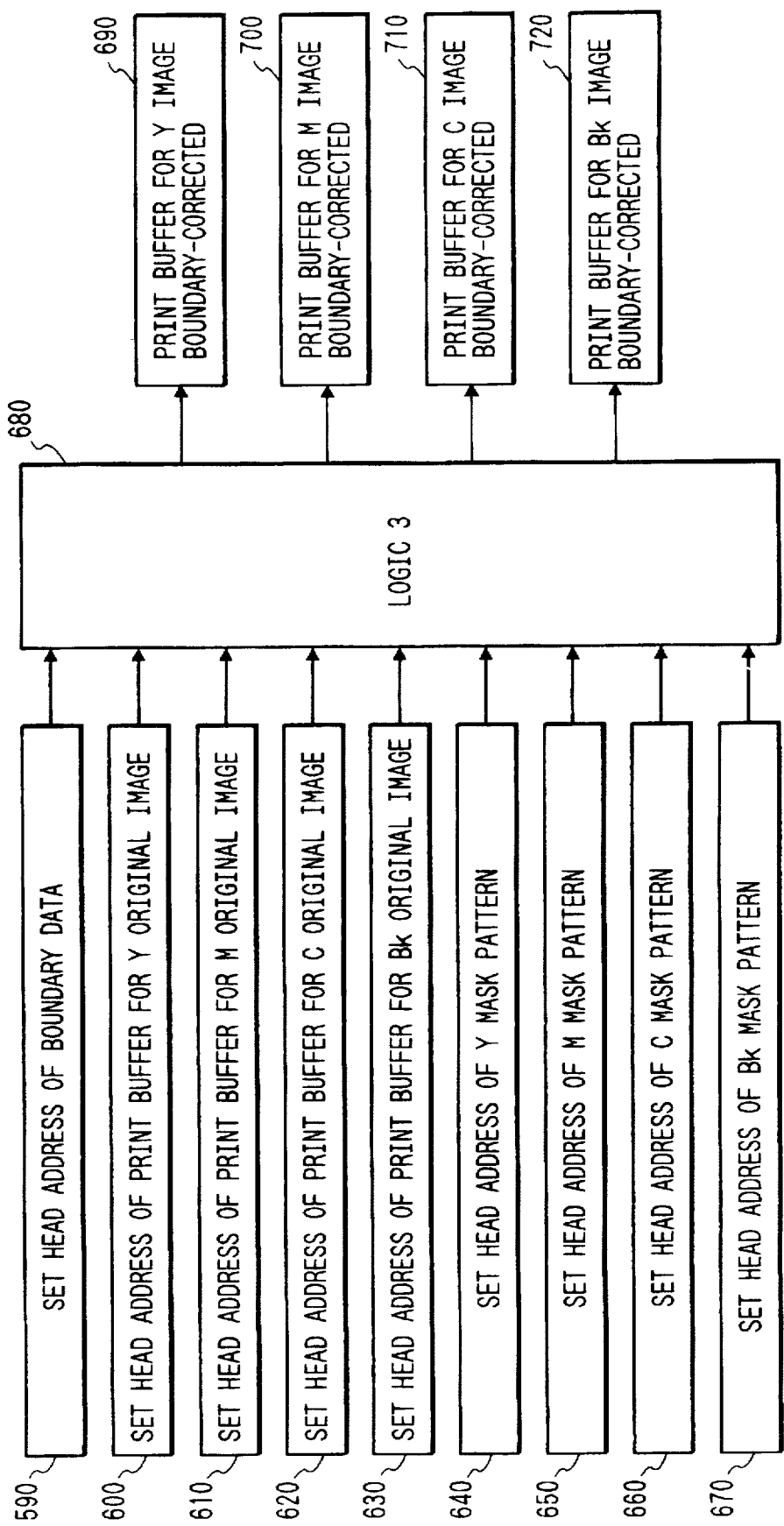

FIGS. 13 to 15 illustrate embodiments of the hardware realized for effecting the above-explained processes. Referring to FIG. 13, start addresses (500, 510, 520) of the print buffers of the Y, M and C images are supplied to a logic 1 (530). The data of each color are regularly stored, starting from said start address. In the present embodiment, the recording pixel data are stored in consecutive addresses.

The logic 1, having received said head address of each color, reads the data of said address (in the unit of a byte in the present embodiment) and stores said data in a memory in the logic 1. Thereafter the logic 1 increases the address by a byte within said logic 1, thereby automatically generating the address to be read next, and thus reads the desired data. The order of data reading is not critical, and the logic 1 is capable of reading desired data at a desired timing (by DMA process) with the command from the CPU.

Consequently, only by the setting, by the CPU, of the head addresses of the original Y, M, C print buffers in the logic 1, it can automatically effect the reading of the original images, calculation of the logic sum for each color, and pixel expansion in plural direction based on said logic sum data, and can also the output (540) of the BD color data (expanded color data) starting from a predetermined address and according to a predetermined rule. In contrast to the software processing in which the CPU is required to effect numerous RAM reading and writing operations, the above-explained hardware can achieve a similar process by mere address settings of three bytes. Also said process merely consists of repetition of a simple process, so that the magnitude of the logic circuit is limited. In the present embodiment, the output addresses of the BD color data are fixed, but the logic may also be so constructed as to select the output addresses.

After the preparation of the BD color data, the CPU sets, in a logic 2 (570), two-byte data indicating the head address (550) of said BD color data and the head address (560) of the stored original Bk image, as shown in FIG. 14. The logic 2 calculates the logic product of both data at said head addresses and releases the result to a predetermined address, and repeats the processes of a predetermined number by address increment according to a predetermined rule, without the intervention of the CPU. Said output constitutes the boundary data (580) in the present embodiment.

Then, as shown in FIG. 15, the CPU sets, in a logic 3 (680), 9-byte data indicating the head address (590) of said boundary data, the head addresses (600, 610, 620, 630) of the original Y, M, C, Bk images and the head addresses (640, 650, 660, 670) of the stored Y, M, C, Bk mask patterns, whereby the logic 3 calculates the logic products of the boundary data and the mask patterns of respective color and the logic sums of said logic product data and the original image data of respective colors, and releases the results at addresses predetermined for respective colors. The above-explained process is repeated for a predetermined number of times by automatic address increment in the logic 3, as explained in the foregoing. The thus obtained output data constitute the print buffers (690, 700, 710, 720) of the image data to be actually recorded, after the pixel replacement in the boundary area.

Formation of such hardware provides boundary control means of an extremely high speed, within a practical cost range.

[Embodiment 4]

Figure 16:
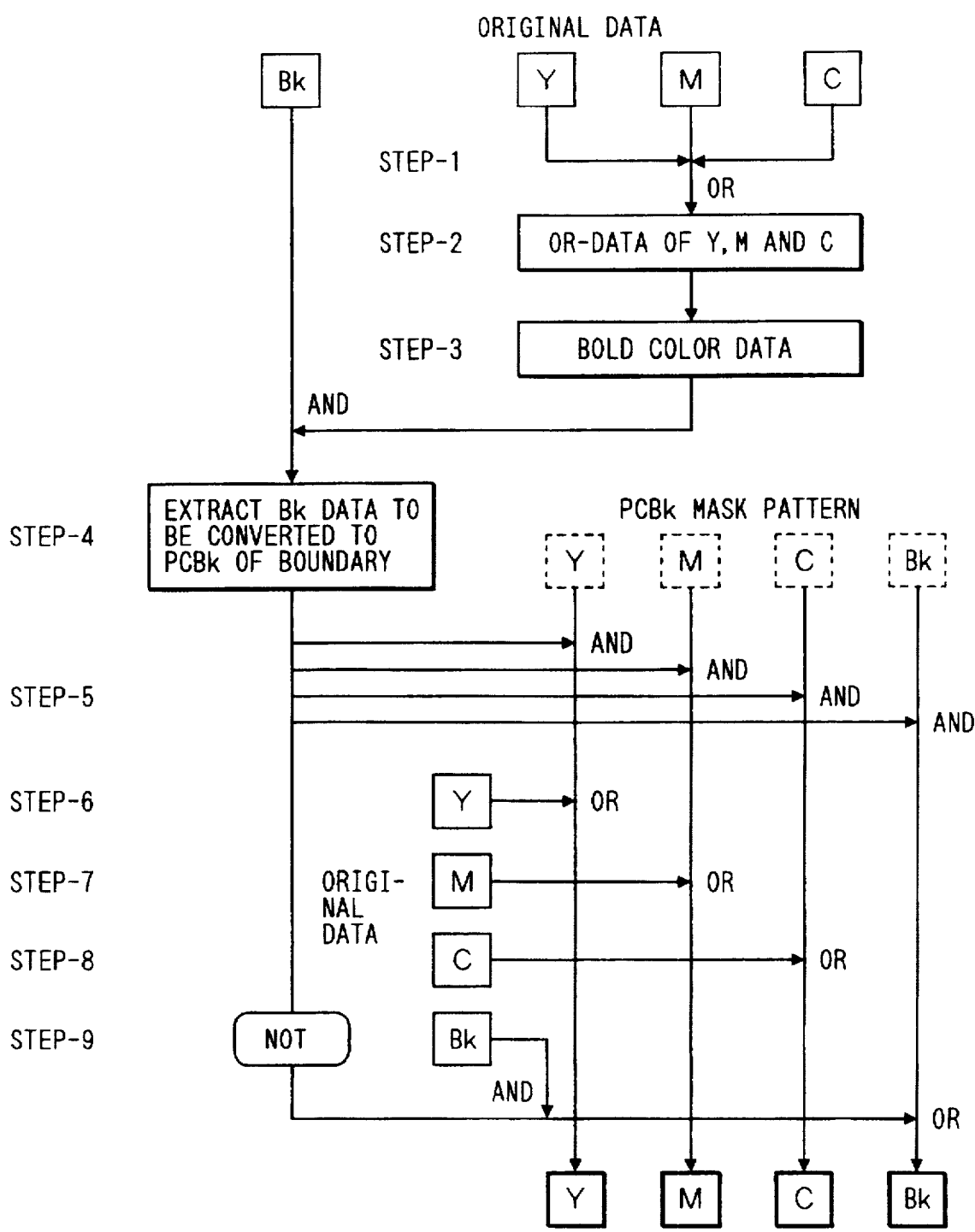
FIG. 16 is a view showing the boundary detecting sequence in an embodiment 4.

FIG. 16 shows the sequence, in the present embodiment, of boundary detection for detecting a black image area adjacent to a color image area and of dot replacement. A step 1 determines a color data area by calculating the logic sum (OR) of the Y, M and C data among the original image data of Y, M, C and Bk colors to be recorded. Then a step 2 temporarily stores said OR data of Y, M and C colors, as color data, in a buffer.

A step 3 generates bold data, by expanding the color data by four bits in four directions, and stores said data temporarily in a buffer. This operation is achieved by drag shift which is a function of a gate array, by calculating the logic sum with the base data under address shifting and bolding the base data in the direction of said shift. This operation is repeated by four bits in each of the upward, downward, rightward and leftward directions, thereby generating 4-bit bold color data.

A step 4 effects the boundary detection by calculating the logic product (AND) of said color bold data and the original black data, and extracts the result as the Bk data for effecting the conversion to the PCBk in the boundary area.

A step 5 calculates the logic product (AND) of thus extracted data for conversion and the PCBk mask pattern (conversion mask) predetermined for each color, thereby generating newly address data for generating the PCBk.

Steps 6, 7 and 8 determine the final image data by calculating the logic sums (OR) of the newly generated PCBk data and the original image data for respective colors. As the PCBk data are generated from the Bk data, it is necessary to delete the data, replaced by the PCBk, from the original data. Thus a step 9 inverts the PCBk data and calculates the logic product (AND) thereof with the original Bk data thereby deleting the PCBk data from the original data, and further calculates the logic sum (OR) with the PCBk data thereby obtaining the final Bk data.

The above-explained sequence allows to control the width (area) of replacement by the PCBk, by a variation in the bold amount of the color data. Also this sequence, if conducted in plural levels, allows to detect the directionality at the boundary between the black image area and the color image area. It is furthermore possible to select suitable PCBk for each color, by detecting the boundary between black color and each color independently.

[Embodiment 5]

Figure 17:
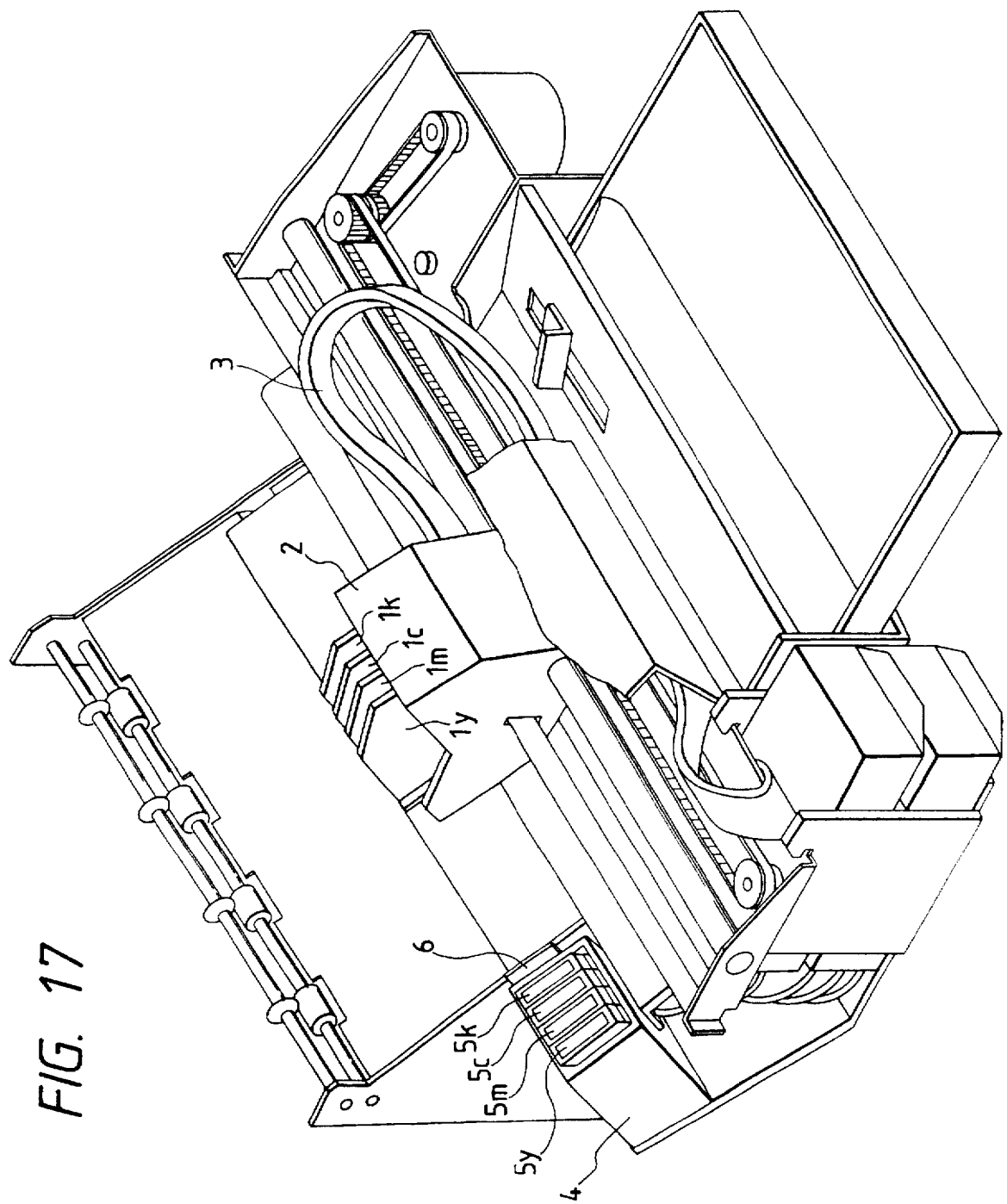
FIG. 17 is a perspective view of another ink jet recording apparatus employed in an embodiment 5 of the present invention.

FIG. 17 is a schematic view of another color ink jet recording apparatus in which the present invention is applicable, wherein provided a yellow ink recording head 1y; a magenta ink recording head 1m; a cyan ink recording head 1c; a first black ink recording head 1b; a second black ink recording head 1k; a carriage 2 supporting the recording heads; a flexible cable 3 for sending electrical signals from the main body of the recording apparatus to the recording heads; a capping unit 4 including recovery means; cap members 5y, 5m, 5c, 5k respectively corresponding to the recording heads 1y, 1m, 1c, 1k; and a wiping blade 6 composed for example of rubber.

The nozzles of the recording heads 1y, 1m, 1c, 1k are constructed in basically same manner as those of the recording head 102 explained in the foregoing embodiments, and each head is provided with 128 discharge nozzles, but each nozzle of the recording heads 1y, 1m, 1c emits ink of about 40 ng while that of the recording head 1k emits ink of about 80 ng. The recording heads 1y, 1m, 1c employ inks of high penetration speeds into the recording sheet, while the recording head 1k employs an ink of a low penetration speed into the recording sheet.

The present invention is applicable also to the recording apparatus explained above. The present embodiment is featured by a shorter recording time, because of parallel array of recording heads of a same size.

In the foregoing embodiments, the image judgement, image development and image replacement are all executed in a control unit of the recording apparatus, based on the data received from the host computer, but the present invention is not limited to such case.

For example, the present invention may be expanded to a system, in which all the processes mentioned above are executed in an external device such as a printer driver and the recording apparatus receives the actual recording data after the pixel replacement. In most cases the external equipment connected to the recording apparatus is a host computer, and the processing ability of the CPU and the capacity of RAM are generally superior in such host computer.

It is also possible to effect the image judgment in the host computer and the image development in the recording apparatus.

The foregoing embodiments have been explained by so-called bubble jet recording method in which a bubble is generated in the ink by an electrothermal converter and the ink is discharged from the recording head by the function of said bubble, but the present invention is likewise applicable to so-called piezoelectric ink jet recording in which the ink is discharged by the function of an electromechanical converter.

The present invention is particularly suitable for use in an ink jet recording head and recording apparatus wherein thermal energy generated by an electrothermal transducer, a laser beam or the like is used to cause a change of state of the ink to eject or discharge the ink. This is because the high density of the picture elements and the high resolution of the recording are possible.

The typical structure and the operational principle of such devices are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 59-123670 wherein a common slit is used as the ejection outlet for plural electrothermal transducers, and to the structure disclosed in Japanese Laid-Open Patent Application No. 59-138461 wherein an opening for absorbing pressure waves of the thermal energy is formed corresponding to the ejecting portion. This is because the present invention is effective to perform the recording operation with certainty and high efficiency regardless of the type of recording head.

In addition, the present invention is applicable to a serial type recording head wherein the recording head is fixed on the main assembly, to a replaceable chip type recording head which is connected electrically with the main apparatus and which can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. Examples of such means include a capping means for the recording head, cleaning means therefore, pressing or sucking means, preliminary heating means which may be the electrothermal transducer, an additional heating element or a combination thereof. Also, means for effecting preliminary ejection (not for the recording operation) can stabilize the recording operation.

As regards the variation of the recording head mountable, it may be a single head corresponding to a single color ink, or may be plural heads corresponding to the plurality of ink materials having different recording colors or densities. The present invention is effectively applied to an apparatus having at least one of a monochromatic mode mainly with black, a multi-color mode with different color ink materials and/or a full-color mode using the mixture of the colors, which may be an integrally formed recording unit or a combination of plural recording heads.

Furthermore, in the foregoing embodiments, the ink has been liquid. It also may be ink material which is solid below the room temperature but liquid at room temperature. Since the ink is kept within a temperature between 30° C. and 70° C., in order to stabilize the viscosity of the ink to provide the stabilized ejection in the usual recording apparatus of this type, the ink may be such that it is liquid within the temperature range when the recording signal is the present invention is applicable to other types of ink. In one of them, the temperature rise due to the thermal energy is positively prevented by consuming it for the state change of the ink from the solid state to the liquid state. Another ink material is solidified when it is left, to prevent the evaporation of the ink. In either of the cases, in response to the application of the recording signal producing thermal energy, the ink is liquefied, and the liquefied ink may be ejected. Another ink material may start to be solidified at the time when it reaches the recording material.

The present invention is also applicable to such, an ink material as is liquefied by the application of the thermal energy. Such an ink material may be retained as a liquid or solid material in through holes or recesses formed in a porous sheet as disclosed in Japanese Laid-Open Patent Application No. 54-56847 and Japanese Laid-Open Patent Application 60-71260. The sheet is faced to the electrothermal transducers. The most effective one of the techniques described above is the film boiling system.

The ink jet recording apparatus may be used as an output terminal of an information processing apparatus such as computer or the like, as a copying apparatus combined with an image reader or the like, or as a facsimile machine having information sending and receiving functions.

While the invention has been described with reference to the structures disclosed herein, it is not confined to the details set forth and this application is intended to cover such modifications or changes as may come within the purpose of the improvements or the scope of the following claims.

The present invention can provide an ink jet recording apparatus capable of achieving high-quality image recording even with different inks positioned in mutual contact.

What is claimed is:

1. An ink jet recording apparatus for image recording by discharging a plurality of inks of different characteristics onto a recording medium, comprising:

expansion means for expanding a recording pixel, the recording pixel to be recorded with at least an ink subjected to pixel expansion, in four directions to a peripheral area;

logic product means for calculating a logic product of the pixel expanded by said expansion means and an other recording pixel to be recorded by an ink not subjected to pixel expansion to obtain a result of calculation; and replacement means for replacing the other recording pixel to be recorded by said ink not subjected to pixel expansion with the pixel to be recorded by said plurality of inks, according to the result of calculation by said logic product means, wherein said ink subjected to pixel expansion and said ink not subjected to pixel expansion are different in penetration characteristics from each other.

2. An ink jet recording apparatus according to claim 1, wherein said replacement means includes a replacement mask pattern for each said ink, and effects said replacement by calculating a logic product of said replacement mask pattern and the result of calculation by said logic product means.

3. An ink jet recording apparatus according to claim 1, further comprising reception means for receiving signals indicating the presence or absence of said recording pixels in binary recording data;

wherein said expansion means, logic product means and replacement means are adapted to process said binary recording data.

4. An ink jet recording apparatus according to claim 1, wherein said ink subjected to pixel expansion is an ink of penetration type, while said ink not subjected to pixel expansion is an ink of evaporation type.

5. An ink jet recording apparatus according to claim 4, wherein said ink of penetration type is a color ink while the ink of evaporation type is a black ink.

6. An ink jet recording apparatus according to claim 5, wherein said color ink is inks of cyan, magenta and yellow colors.

7. An ink jet recording apparatus according to claim 1, wherein said plural inks of different characteristics are discharged from a recording head.

8. An ink jet recording apparatus according to claim 7, further comprising a carriage for supporting said recording head.

9. An ink jet recording apparatus according to claim 7, further comprising transport means for transporting the recording medium to be recorded by said recording head.

10. An ink jet recording apparatus according to claim 1, adapted to be applied to a copying apparatus.

11. An ink jet recording apparatus according to claim 1, adapted to be applied to a facsimile apparatus.

12. An ink jet recording apparatus according to claim 1, adapted to be applied to a computer terminal.

13. An ink jet recording apparatus according to claim 1, wherein each of said plural inks is discharged by thermal energy.

14. An ink jet recording apparatus for image recording by discharging a plurality of inks of different characteristics onto a recording medium, comprising:

boundary detection means for detecting a boundary around an object pixel by detecting a presence of a pixel to be formed by a given said ink of different characteristics within a distance of 1 mm, on the recording medium; and replacement means for replacing said object pixel with a pixel to be formed by a plurality of inks including said ink of different characteristics, according to the detection of the boundary pixel by said boundary detection means.

15. An ink jet recording apparatus according to claim 14, wherein the ink for forming said object pixel is an ink of evaporation type, while said ink of different characteristics is an ink of penetration type.

16. An ink jet recording apparatus according to claim 15, wherein said ink of penetration type is a color ink, and said ink of evaporation type is a black ink.

17. An ink jet recording apparatus according to claim 16, wherein said color ink is inks of cyan, magenta and yellow colors.

18. An ink jet recording apparatus according to claim 14, wherein said plural inks of different characteristics are discharged from a recording head.

19. An ink jet recording apparatus according to claim 18, further comprising a carriage for supporting said recording head.

20. An ink jet recording apparatus according to claim 18, further comprising transport means for transporting the recording medium to be recorded by said recording head.

21. An ink jet recording apparatus according to claim 14, adapted to be applied to a copying apparatus.

22. An ink jet recording apparatus according to claim 14, adapted to be applied to a facsimile apparatus.

23. An ink jet recording apparatus according to claim 14, adapted to be applied to a computer terminal.

24. An ink jet recording apparatus according to claim 14, wherein each of said plural inks is discharged by thermal energy.

25. An ink jet recording apparatus for image recording by discharging a black ink and at least a color ink onto a recording medium, comprising:

a black memory and a color memory for two-dimensionally storing, respectively, a recording data, corresponding to a plurality of pixels where black and color inks are respectively to be discharged;

expansion means for two-dimensionally expanding the recording data of said color memory;

logic product means for calculating a logic product, for each said pixel, of the recording data, expanded by said expansion means, of said color memory and the recording data of said black memory, to obtain a result of calculation; and replacement means for replacing the recording data of said black memory with the corresponding recording data of said color memory, according to the result of calculation of said logic product means.

26. An ink jet recording apparatus according to claim 25, wherein said color ink is inks of cyan, magenta and yellow colors.

27. An ink jet recording apparatus according to claim 26, wherein said color memory includes cyan, magenta and yellow memories, and said replacement means includes replacement mask patterns respectively corresponding to each color and effects replacement to said cyan, magenta and yellow memories by calculating the logic products of said replacement mask patterns and the result of calculation by said logic product means.

28. An ink jet recording apparatus according to claim 25, wherein said color ink is an ink of penetration type, and said black ink is an ink of evaporation type.

29. An ink jet recording apparatus according to claim 25, wherein said black ink and color ink are discharged from a recording head.

30. An ink jet recording apparatus according to claim 29, further comprising a carriage for supporting said recording head.

31. An ink jet recording apparatus according to claim 29, further comprising transport means for transporting the recording medium to be recorded by said recording head.

32. An ink jet recording apparatus according to claim 25, adapted to be applied to a copying apparatus.

33. An ink jet recording apparatus according to claim 25, adapted to be applied to a facsimile apparatus.

34. An ink jet recording apparatus according to claim 25, adapted to be applied to a computer terminal.

35. An ink jet recording apparatus according to claim 25, wherein each of said inks is discharged by thermal energy.

36. An ink jet recording method for image recording by discharging a plurality of inks of different characteristics onto a recording medium, comprising steps of:
   expanding a pixel to be recorded by at least an ink subjected to pixel expansion in four directions to a peripheral;
   calculating a logic product of the expanded pixel and an other recording pixel to be recorded by an ink not subjected to pixel expansion to obtain a result of calculation;
   replacing the other recording pixel to be recorded by said the ink not subjected to pixel expansion with the pixel to be recorded by said plurality of inks subjected to pixel expansion, according to the result of calculation of said logic product; and
   discharging the inks corresponding to the replacement of the pixels onto the recording medium.

37. An ink jet recording method for image recording by discharging a plurality of inks of different characteristics onto a recording medium, comprising steps of:
   detecting a boundary around an object pixel by detecting a presence of a pixel to be formed by a given said ink of different characteristics within a distance of 1 mm on the recording medium;
   replacing said object pixel with a pixel to be formed by a plurality of inks including said ink of different characteristics according to a result of detection in said detecting step; and
   discharging those of the inks corresponding to the replacement of pixels onto the recording medium.

38. An ink jet recording method for image recording by discharging a black ink and at least a color ink onto a recording medium, comprising steps of:
   two-dimensionally storing a recording data, corresponding to a plurality of pixels where black ink and color ink are to be respectively discharged, in a black memory and a color memory, respectively;
   two-dimensionally expanding the recording data of said color memory;
   calculating a logic product, for each said pixel, of the expanded recording data of the color memory and the recording data of the black memory, to obtain a result of calculation;
   replacing the recording data of said black memory with the corresponding recording data of said color memory according to the result of calculation of the logic product; and
   discharging those of the inks corresponding to the replacement of pixels onto the recording medium.

39. An ink jet recording apparatus according to claim 5, wherein pixel expansion by said expansion means is expanded for a pixel to be recorded in the color ink.

40. An ink jet recording apparatus as in claim 25, further comprising changing means for changing an amount of expansion by said expansion means.

41. An ink jet recording method as in claim 36, further comprising the step of changing an amount of expansion in said expanding step.

42. An ink jet recording method as in claim 38, further comprising the step of changing an amount of expansion in said two-dimensionally expanding step.

* * * * *

UNITED STATES PATENT AND TRADEMARK OFFICE
CERTIFICATE OF CORRECTION

PATENT NO. : 5,751,310

DATED : May 12, 1998

INVENTOR(S) : KENTARO YANO, ET AL.

It is certified that error appears in the above-identified patent and that said Letters Patent is hereby corrected as shown below:

ON THE TITLE PAGE:

AT [57] ABSTRACT

Line 5, "direction," should read --directions,--; and
    Line 10, "(Y, M, C)" should read
        --of either yellow, magenta or cyan color--.

COLUMN 2

Line 45, "therefore," should read --therefor,--.

COLUMN 5

Line 35, close up right margin; and
    Line 36, close up left margin.

COLUMN 6

Line 8, "illustrate" should read --illustrates--.

COLUMN 7

Line 1, "a RAM" should read --and a RAM--; and
    Line 27, "312" should read --312 C--.

COLUMN 8

Line 8, "of" should read --of an--.

COLUMN 9

Line 30, "case." should read --cases.--.

UNITED STATES PATENT AND TRADEMARK OFFICE
CERTIFICATE OF CORRECTION

PATENT NO. : 5,751,310

DATED : May 12, 1998

INVENTOR(S) : KENTARO YANO, ET AL.

Page 2 of 3

It is certified that error appears in the above-identified patent and that said Letters Patent is hereby corrected as shown below:

COLUMN 12

Line 63, "accesses" should read --access--.

COLUMN 13

Line 3, "respectively" should read --respective--; and
    Line 28, "also" should read --also effect--.

COLUMN 16

Line 12, "on." should read --on--;
    Line 45, "is the" should read --of the--;
    Line 56, "such," should read --such--;
    Line 62, "Application 60-71260." should read
        --Application No. 60-71260.--.

COLUMN 17

Line 40, "data;" should read --data,--.

COLUMN 18

Line 16, "pixel" should read --around an object pixel--.

COLUMN 19

Line 34, "peripheral;" should read
        --peripheral area;--; and
    Line 40, "the" (first occurrence) should be deleted.

UNITED STATES PATENT AND TRADEMARK OFFICE
CERTIFICATE OF CORRECTION

PATENT NO. : 5,751,310
DATED : May 12, 1998
INVENTOR(S) : KENTARO YANO, ET AL.

Page 3 of 3

It is certified that error appears in the above-identified patent and that said Letters Patent is hereby corrected as shown below:

COLUMN 20

Line 34, "expanded" should read --conducted--.

Signed and Sealed this

Twenty-third Day of February, 1999

Attest:

Attesting Officer

Q. TODD DICKINSON

Acting Commissioner of Patents and Trademarks